United States Patent
Hirao et al.

(10) Patent No.: US 11,938,590 B2
(45) Date of Patent: Mar. 26, 2024

(54) SHOT TREATMENT APPARATUS AND SHOT TREATMENT METHOD

(71) Applicant: SINTOKOGIO, LTD., Nagoya (JP)

(72) Inventors: Michiaki Hirao, Toyokawa (JP); Akiyoshi Suyama, Toyokawa (JP); Shoji Isobe, Toyokawa (JP)

(73) Assignee: SINTOKOGIO, LTD., Nagoya (JP)

( * ) Notice: Subject to any disclaimer, the term of this patent is extended or adjusted under 35 U.S.C. 154(b) by 933 days.

(21) Appl. No.: 16/921,520

(22) Filed: Jul. 6, 2020

(65) Prior Publication Data
US 2021/0101256 A1    Apr. 8, 2021

(30) Foreign Application Priority Data
Oct. 2, 2019    (JP) ................ 2019-181808

(51) Int. Cl.
*B24C 3/02*    (2006.01)
*B24C 3/12*    (2006.01)
(Continued)

(52) U.S. Cl.
CPC .............. *B24C 3/12* (2013.01); *B24C 3/02* (2013.01); *B24C 3/16* (2013.01); *B24C 3/22* (2013.01); *B24C 3/32* (2013.01); *B24C 5/04* (2013.01)

(58) Field of Classification Search
CPC .... B24C 3/02; B24C 3/12; B24C 3/16; B24C 3/18; B24C 3/20; B24C 3/22; B24C 3/32; B24C 5/02; B24C 5/04
(Continued)

(56) References Cited

U.S. PATENT DOCUMENTS 6,887,125 B2 * 5/2005 Kurogouchi .............. B24C 1/08
                                                                      451/48
11,370,085 B2 * 6/2022 Asai ........................ B23F 19/00
(Continued)

FOREIGN PATENT DOCUMENTS

JP    H08-90417 A    4/1996
JP    H0890417 A  *  4/1996
(Continued)

OTHER PUBLICATIONS

Oct. 18, 2022 Office Action issued in Japanese Patent Application No. 2019-181808.

*Primary Examiner* — Eileen P Morgan
(74) *Attorney, Agent, or Firm* — Oliff PLC

(57) ABSTRACT

A shot treatment apparatus ejects shot material from a nozzle towards a workpiece, and has the nozzle; a nozzle moving mechanism; and a three-dimensional information obtaining sensor; a pattern storage portion storing a nozzle reference operation pattern when the workpiece is installed at a reference position and a reference pose within the treatment compartment; a model data storage portion storing workpiece three-dimensional model data; a position/pose displacement calculating portion comparing the position and pose information and reference position and pose data when the three-dimensional model data is at the reference position in the reference pose to calculate a displacement in a position and pose of the workpiece from the reference position and pose data; and a nozzle movement control portion correcting the pattern based on the displacement in the position and pose, and controlling the nozzle moving mechanism to move the nozzle based on the corrected pattern.

13 Claims, 12 Drawing Sheets

(51) Int. Cl.
*B24C 3/16* (2006.01)
*B24C 3/22* (2006.01)
*B24C 3/32* (2006.01)
*B24C 5/04* (2006.01)

(58) Field of Classification Search
USPC ..... 451/2, 3, 5, 9, 10, 11, 38, 75, 80, 82, 90
See application file for complete search history.

(56) References Cited

U.S. PATENT DOCUMENTS

2009/0270014 A1* 10/2009 Miller .................... B08B 3/024
451/39
2017/0129066 A1 5/2017 Okuda

FOREIGN PATENT DOCUMENTS

| JP | 2014-18896 A | 2/2014 |
|----|---|---|
| JP | 2017-91269 A | 5/2017 |
| JP | 2019-89148 A | 6/2019 |
| WO | WO-2020173111 A1 * | 9/2020 |
| WO | WO-2020262978 A2 * | 12/2020 |

* cited by examiner

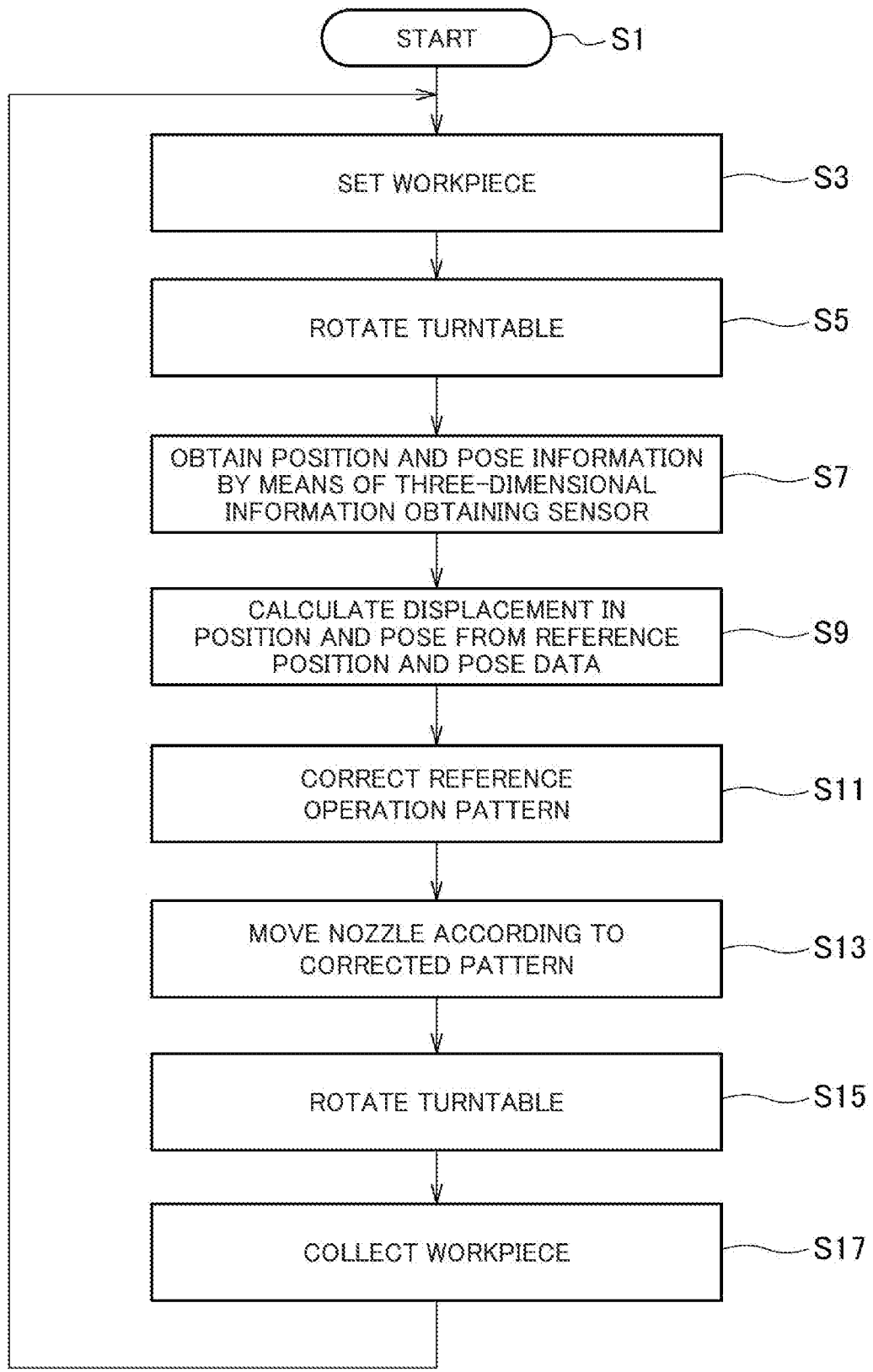

SHOT TREATMENT APPARATUS AND SHOT TREATMENT METHOD

TECHNICAL FIELD

The present invention relates to a shot treatment apparatus and a shot treatment method.

BACKGROUND

Conventionally, shot blasting in which shot material, which is granular matter, is caused to collide with a workpiece, which is the treatment target, to machine the workpiece has been widely practiced for the purpose of for example casting shake-out and shot peening.

There are cases in shot blasting when it is desirable to subject only a required location on the workpiece to a shot treatment.

For example, Patent Document 1 discloses a deburring method and an apparatus therefor, comprising: a workpiece conveyor that transports a workpiece placed thereon; an imaging apparatus which is provided above the work conveyor and which captures images of the outline of the workpiece; a shot blast ejection nozzle which is provided above the work conveyor and which ejects shot blast towards the workpiece; a program generating means that generates a relative movement program of the workpiece and the shot blast ejection nozzle based on the outline of the workpiece captured by the imaging apparatus; and a movement driving means that moves the workpiece and the shot blast ejection nozzle relatively according to the program generated by this program generating means.

More specifically, the contours of the workpiece are discriminated based on the images captured by the imaging apparatus from one direction and the nozzle is moved along these contours in the deburring apparatus of Patent Document 1.

CITATION LIST

Patent Literature

Patent Document 1: JP H8-90417 A

SUMMARY OF INVENTION

Technical Problem

Because the shot material is radially ejected from the distal end of the nozzle, the area of the workpiece surface that is subjected to a shot treatment increases the farther the distal end of the nozzle is from the workpiece. For this reason, when only a required location on the workpiece is to be subjected to a shot treatment, as described above, the distal end of the nozzle needs to be positioned in the vicinity of the location on the workpiece.

Here, in Patent Document 1, the movement path of the nozzle is determined based on two-dimensional information obtained from one direction by the imaging apparatus. For this reason, if the distal end of the nozzle is moved into the vicinity of the workpiece as described above when, within the linear direction linking the imaging apparatus and the workpiece, the workpiece is tilted towards the imaging device side or is installed at a position offset towards the imaging apparatus side, the nozzle may collide with the workpiece and damage either or both the nozzle and the workpiece.

A problem to be solved by the present invention is to provide a shot treatment apparatus and a shot treatment method that are capable of moving a nozzle into the vicinity of a workpiece to perform a shot treatment while suppressing collision between the nozzle and the workpiece.

Solution To Problem

The present invention employs the means below in order to solve the above-mentioned problem. Specifically, the present invention provides a shot treatment apparatus that ejects shot material from a nozzle towards a workpiece to subject the workpiece to a shot treatment, the shot treatment apparatus comprising: the nozzle; a nozzle moving mechanism to which the nozzle is fixed and which is capable of modifying a position and a pose of the nozzle with respect to the workpiece; and a three-dimensional information obtaining sensor that three-dimensionally captures an image of the workpiece provided within a treatment compartment to obtain position and pose information of the workpiece; the shot treatment apparatus further comprising: a pattern storage portion in which is stored a reference operation pattern of the nozzle when the workpiece is installed at a reference position and a reference pose within the treatment compartment; a model data storage portion in which is stored three-dimensional model data of the workpiece; a position/pose displacement calculating portion that compares the position and pose information obtained by means of the three-dimensional information obtaining sensor and reference position and pose data when the three-dimensional model data is provided at the reference position in the reference pose to calculate a displacement in a position and pose of the workpiece from the reference position and pose data; and a nozzle movement control portion that corrects the reference operation pattern of the nozzle based on the displacement in the position and pose and controls the nozzle moving mechanism to move the nozzle based on the corrected reference operation pattern.

In addition, the present invention provides a shot treatment method wherein shot material is ejected from a nozzle towards a workpiece to subject the workpiece to a shot treatment, the method comprising: storing a reference operation pattern of the nozzle, performed by a nozzle moving mechanism to which the nozzle is fixed and which is capable of modifying a position and a pose of the nozzle with respect to the workpiece, when the workpiece is installed at a reference position and a reference pose within a treatment compartment; storing three-dimensional model data of the workpiece; obtaining position and pose information of the workpiece by means of a three-dimensional information obtaining sensor that three-dimensionally captures an image of the workpiece provided within the treatment compartment; comparing the position and pose information obtained by means of the three-dimensional information obtaining sensor and reference position and pose data when the three-dimensional model data is provided at the reference position in the reference pose and calculating a displacement in a position and pose of the workpiece from the reference position and pose data; and correcting the reference operation pattern of the nozzle based on the displacement in the position and pose and controlling the nozzle moving mechanism to move the nozzle based on the corrected reference operation pattern.

Effects Of Invention

According to the present invention, it is possible to provide a shot treatment apparatus and a shot treatment method that are capable of moving a nozzle into the vicinity of a workpiece to perform a shot treatment while suppressing collision between the nozzle and the workpiece.

BRIEF DESCRIPTION OF DRAWINGS

FIG. 12 is a flow chart of a shot treatment method using the shot treatment apparatus.

DESCRIPTION OF EMBODIMENTS

Hereinafter, embodiments of the present invention will be described in detail with reference to the drawings.

Figure 1:
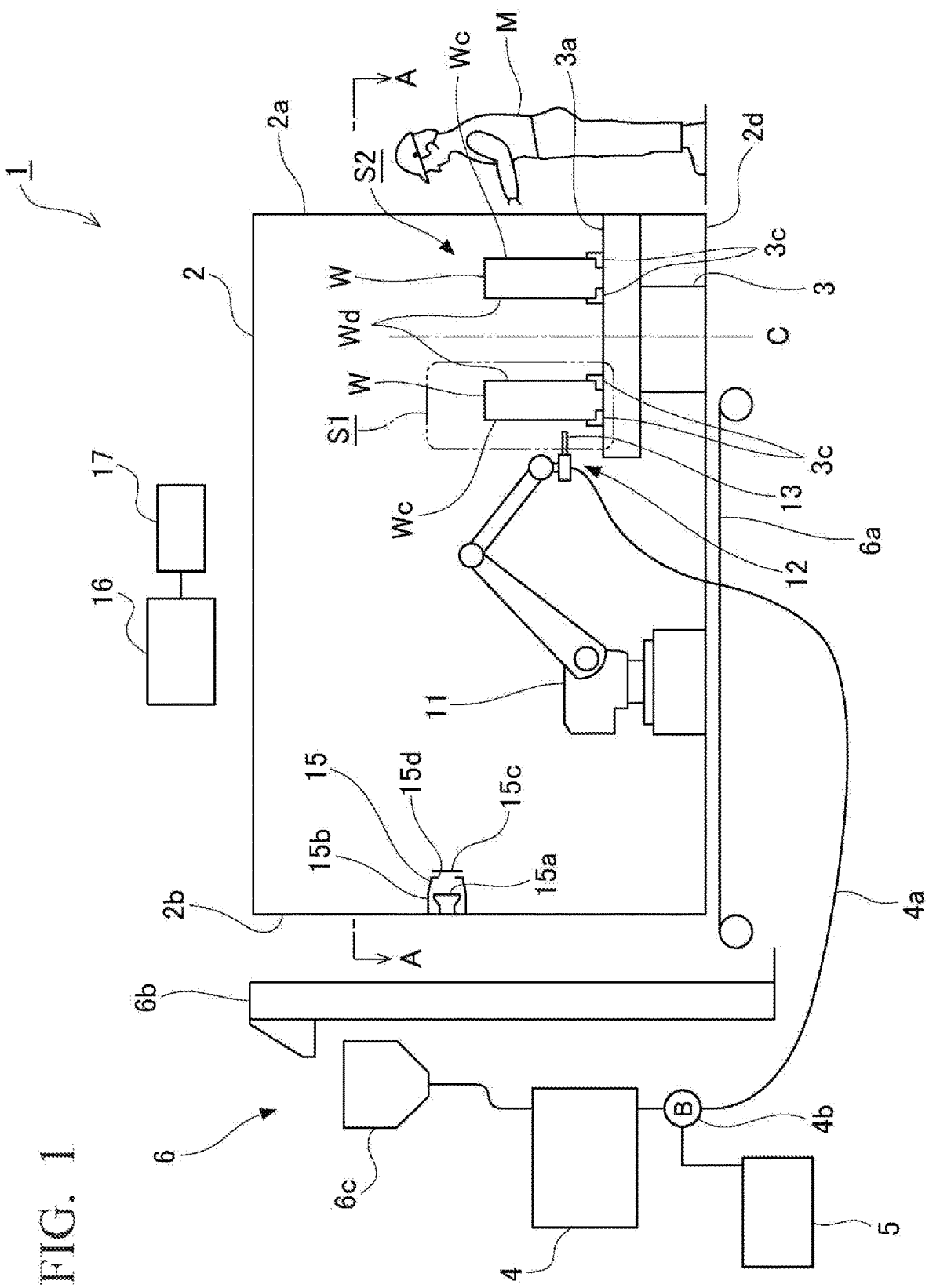
FIG. 1 is a schematic side view of a shot treatment apparatus in an embodiment of the present invention.
Figure 2:
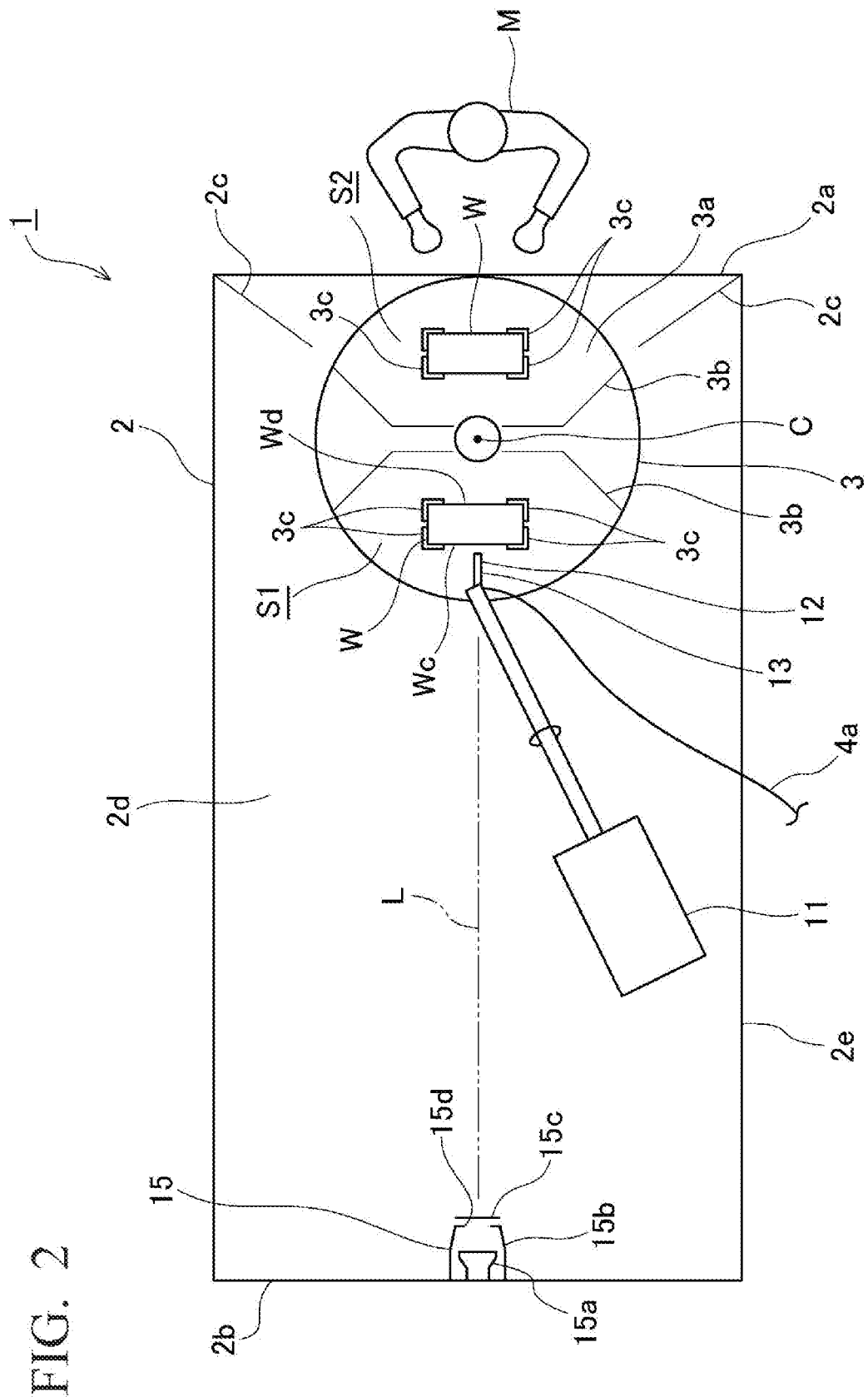
FIG. 2 is a plan view of the vicinity of a cabinet of the shot treatment apparatus and is a cross-sectional view along A-A of FIG. 1.

FIG. 1 is a schematic side view of a shot treatment apparatus in an embodiment of the present invention. FIG. 2 is a plan view of the vicinity of a cabinet of the shot treatment apparatus and is a cross-sectional view along A-A of FIG. 1.

A shot treatment apparatus 1 in the present embodiment ejects shot material from a nozzle 13 towards a workpiece W to subject the workpiece W to a shot treatment. More specifically, the shot treatment apparatus 1 is used for removing foundry sand adhered to the workpiece W, which was produced by casting.

The shot treatment apparatus 1 comprises a cabinet 2, a turntable 3, an air ejection apparatus 4, a valve stand unit 5, a shot circulation apparatus 6, a nozzle moving mechanism 11, a nozzle portion 12 having the nozzle 13, a three-dimensional information obtaining sensor 15, a control apparatus 16, and an input apparatus 17.

A shot treatment is performed within the cabinet 2. In the present embodiment, the cabinet 2 is formed as a chamber having an outer contour with a substantially rectangular parallelepiped shape. A first wall 2a, which is one wall of the cabinet 2, is opened to the outside and the turntable 3 to be described next is provided so as to block this opening.

The turntable 3 is constituted by one surface 3a of a table-like member, which is formed in a substantially circular shape, being provided so as to be horizontal and rotatable within a horizontal plane with the substantially circular center as a vertical axis C.

Two compartment walls 3b illustrated in FIG. 2 are formed on the turntable 3 so as to rise vertically from the top surface 3a, so as to compartmentalize the space above the turntable 3 into two compartments S1, S2 having a substantially identical shape. The compartment walls 3b are omitted in FIG. 1 to simplify the drawing.

The turntable 3 is configured so as to be at rest in a state in which one of the two compartments S1, S2 faces the first wall 2a of the cabinet 2 and the other faces a second wall 2b opposite the first wall 2a. As illustrated in FIG. 2, compartment walls 2c are provided in the cabinet 2, which continue from both ends of the first wall 2a to the compartment wall 3b positioned on the first wall 2a side and forming the compartment S2 on the first wall 2a side. When the turntable 3 is at rest, the cabinet 2 is sealed by the compartment walls 2c of the cabinet 2 and the compartment wall 3b of the turntable 3. Consequently, leakage of the shot material and ejected air during the shot treatment inside the cabinet 2 is suppressed.

A worker M stands on the outer side of the first wall 2a of the cabinet 2 and installs a workpiece W to be subjected to a shot treatment on the top surface 3a of the turntable 3 in the installation compartment S2, which is the compartment on the first wall 2a side. Then, the turntable 3 rotates 180° about the axis C and the installed workpiece W moves to the treatment compartment S1, which is the compartment on the second wall 2b side.

The workpiece W that has moved to the treatment compartment S1 is subjected to the shot treatment, as described below. During this treatment, the worker M installs a workpiece W to be treated next on the top surface 3a of the turntable 3 in the installation compartment S2.

When the shot treatment of the workpiece W that has moved to the treatment compartment S1 ends, the turntable 3 further rotates 180° about the axis C. Consequently, the workpiece W that was subjected to the shot treatment moves to the installation compartment S2, and the workpiece W that was installed by the worker M during the shot treatment simultaneously moves into the treatment compartment S1. As the shot treatment apparatus 1 subjects this workpiece W that has newly moved to the treatment compartment S1 to a shot treatment, the worker M collects the workpiece W that moved to the treatment compartment S2 after being subjected to the shot treatment and further installs the next workpiece W to be subjected to a shot treatment in the installation compartment S2.

In this manner, the installation, shot treatment, and collection of workpieces W is repeated.

The ejection apparatus 4 comprises a tank in which compressed air is enclosed or to which compressed air is continuously supplied. Shot material such as shot, grit, and cut wire is supplied to the tank by the shot circulation apparatus 6 described below. A hose 4a is provided between the tank and the nozzle 13, which ejects the shot material towards the workpiece W. The shot material is supplied, together with the compressed air, to the nozzle 13 through this hose 4a.

A valve 4b for controlling the supplied amount of shot material is provided to the hose 4a.

The valve stand unit 5 controls the opening and closing of this valve 4b.

The shot circulation apparatus 6 comprises a conveyor 6a, a bucket elevator 6b, and a hopper 6c.

The shot material ejected towards the workpiece W drops to a floor 2d of the cabinet 2 after colliding with the workpiece W. The conveyor 6a is provided to the floor 2d of the cabinet 2 and conveys fallen shot material outside of the cabinet 2. The shot material conveyed by the conveyor 6a is moved into the hopper 6c by the bucket elevator 6b and stored in the hopper 6c. The hopper 6c supplies the shot material to the ejection apparatus 4.

Thus, the shot material is circulated and used within the shot treatment apparatus 1.

Figure 3:
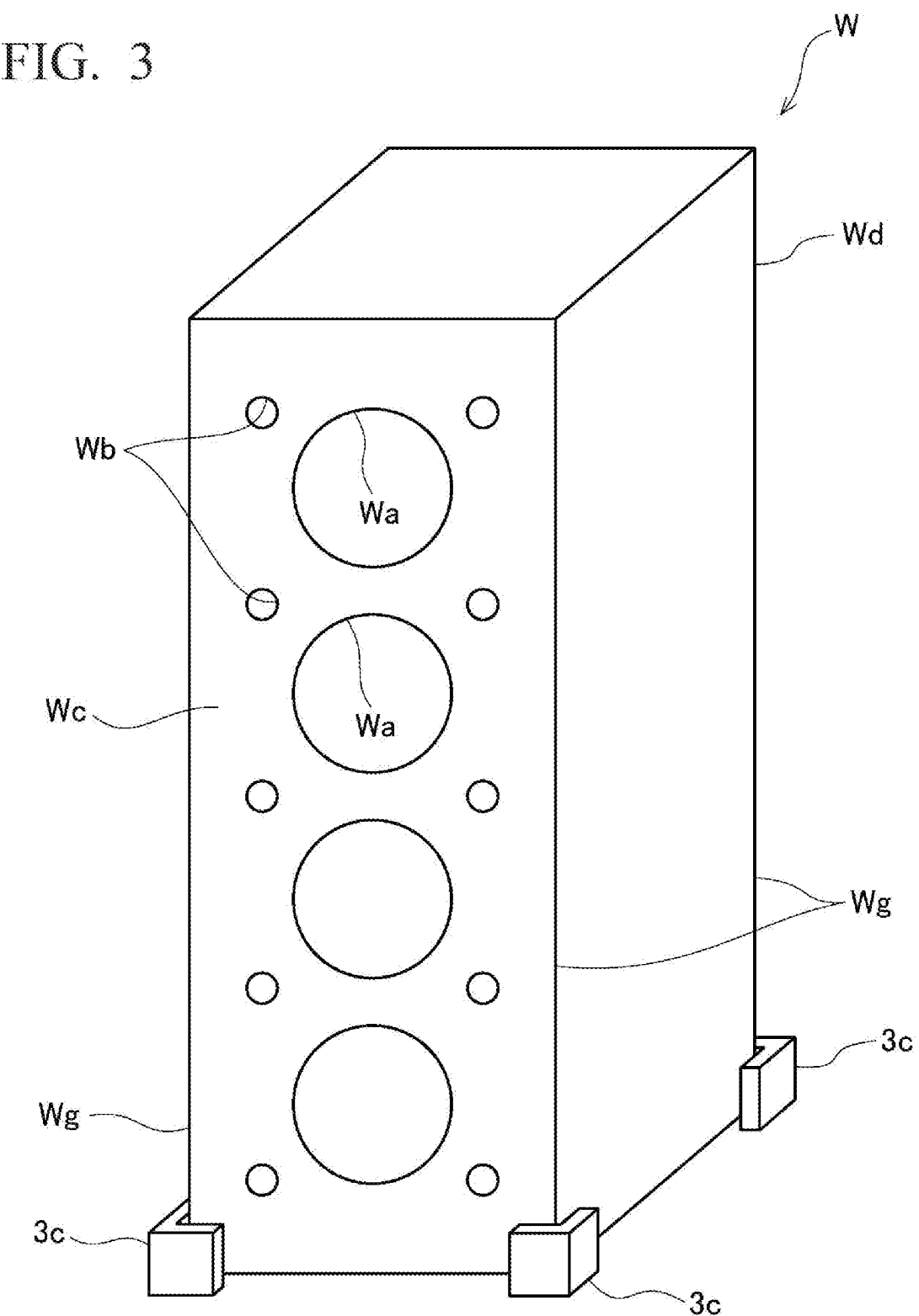
FIG. 3 is a perspective view of a workpiece to be subjected to a shot treatment in the shot treatment apparatus.

Next, the target to be subjected to shot treatment by the shot treatment apparatus 1 in the present embodiment, that is, the workpiece W, will be described. FIG. 3 is a perspective view of the workpiece W to be subjected to the shot treatment in the shot treatment apparatus 1.

In the present embodiment, the workpiece W is a cylinder block for an internal combustion engine. In the present embodiment and FIG. 3, the workpiece W is described as forming a substantially rectangular parallelepiped shape for simplicity of description, but needless to say, the present invention is not so limited.

A plurality of cylinder bores Wa into which pistons are inserted are provided in the workpiece W. A plurality of holes Wb, which are ducts through which a coolant is allowed to flow and which circulate the coolant for the purpose of cooling the internal combustion engine, are provided around each of these cylinder bores Wa. The holes Wb for example have an inner diameter of around 9 mm and are provided so as to pass through from one surface We of the workpiece W to an opposite surface Wd. As illustrated in FIGS. 1 and 2, during a shot treatment, the workpiece W is installed on the turntable 3 such that this surface We becomes an opposing surface We opposing the nozzle 13, and the surface Wd on the opposite side becomes an opposite surface Wd facing the first wall 2a of the cabinet 2.

A plurality of positioning members 3c are provided on the turntable 3 such that the workpiece W can be provided at a position within a certain fixed area on the top surface 3a of the turntable 3. The positioning members 3c are preferably formed into a shape that follows the shape of the workpiece W. In the present embodiment, because the workpiece W is formed as a substantially rectangular parallelepiped shape, the positioning members 3c are formed as an L-shape corresponding to corners Wg of the workpiece W. The positioning members 3c are provided such that the faces located on the inner side of the L-shape, corresponding to the four corners Wg of the workpiece W provided on the top surface 3a, oppose each of the surfaces positioned in the vicinity of the corners Wg of the workpiece W and surround the outsides of the workpiece W.

In the present embodiment, the installation of the workpiece W in the installation compartment S2 is manually performed by the worker M, as previously described. This installation work would not be as easy to perform if the positioning members 3c are provided so as to be in close contact with the workpiece W. Accordingly, the positioning members 3c are provided such that a gap is formed between the workpiece W and the positioning members 3c when the workpiece W is installed. For this reason, the position and the pose, that is, the installation angle, of the workpiece W to be treated in the treatment compartment S1 are, strictly speaking, always different within the area allowed by the gap.

The shot treatment apparatus 1 of the present embodiment subjects the wall surfaces, in particular the wall surfaces inside the holes Wb, of the workpiece W as described above to a shot treatment. For this reason, the workpiece W actually subjected to the shot treatment by means of the shot treatment apparatus 1 has surfaces, aside from the holes Wb, that have already been subjected to a shot treatment by means of another shot treatment apparatus. In other words, the shot treatment apparatus 1 can be particularly suitably used for cleaning following a shot treatment by means of a general shot treatment apparatus in order to subject the interior of a hole Wb, which is not easy to subject to a shot treatment by means of a general shot treatment apparatus, to a shot treatment.

Next, a form of the nozzle moving mechanism 11 and the nozzle portion 12 of the shot treatment apparatus 1 for making it possible to appropriately execute the shot treatment of the holes Wb of the workpiece W in this manner will be described.

The nozzle portion 12 having the nozzle 13 is fixed to the nozzle moving mechanism 11, which is configured so as to be capable of modifying the position and the pose of the nozzle 13 with respect to the workpiece W.

Figure 4:
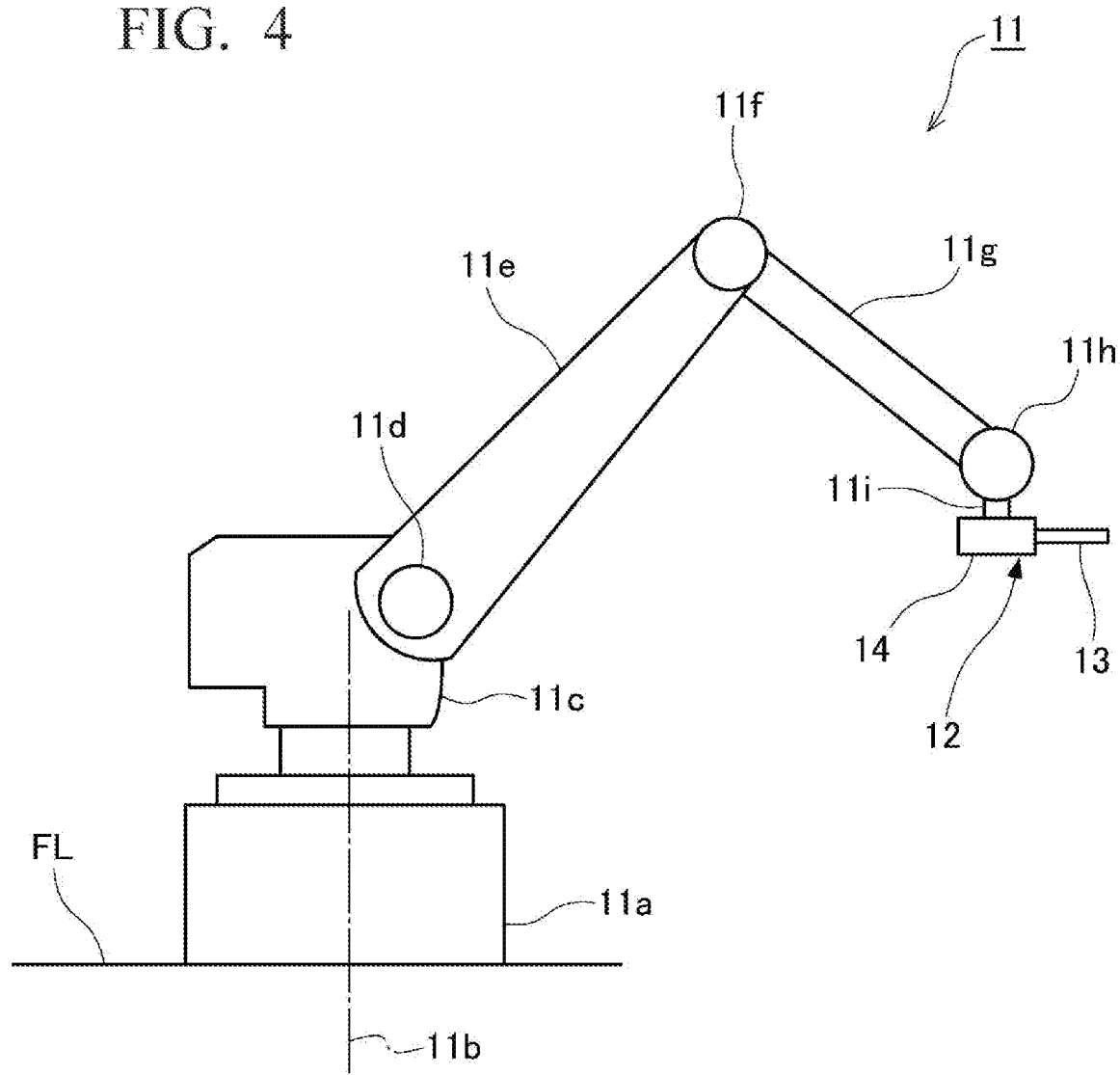
FIG. 4 is a side view of a nozzle moving mechanism provided within the cabinet.
Figure 5A:
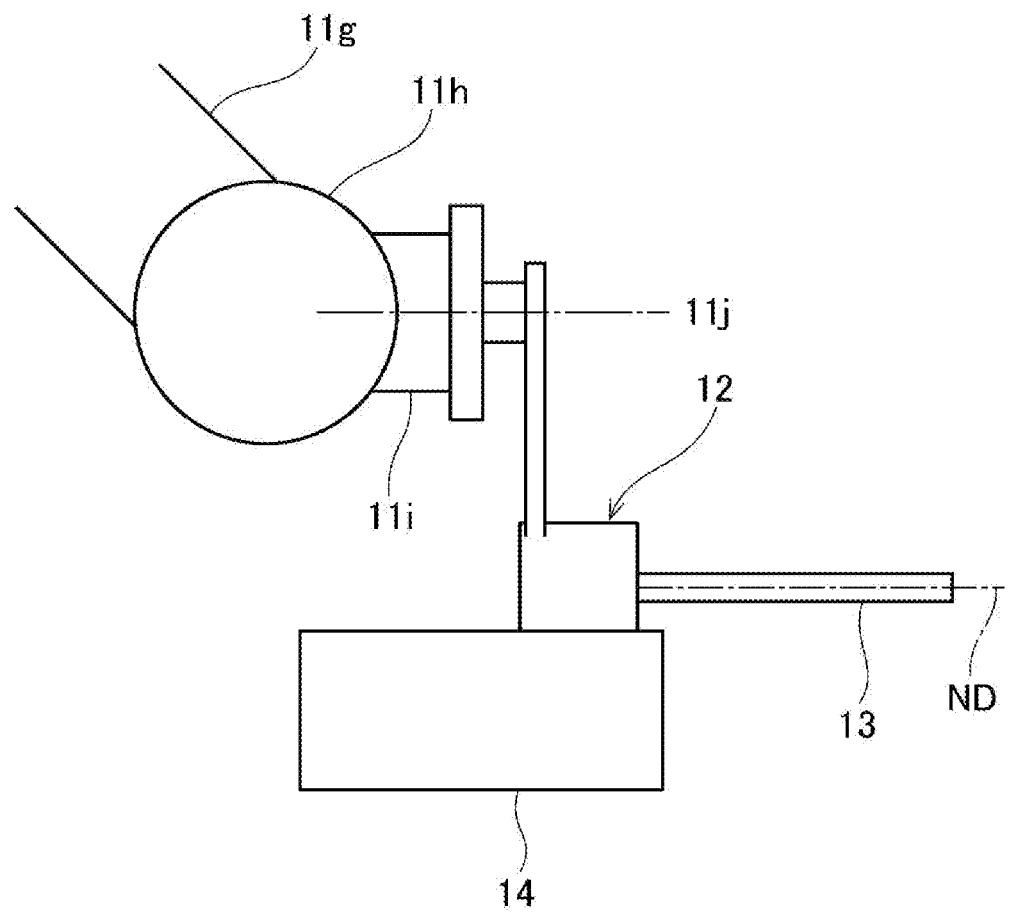
FIG. 5A is a side view of the vicinity of a nozzle portion of the nozzle moving mechanism and FIG. 5B is a plan view of the nozzle portion.
Figure 5B:
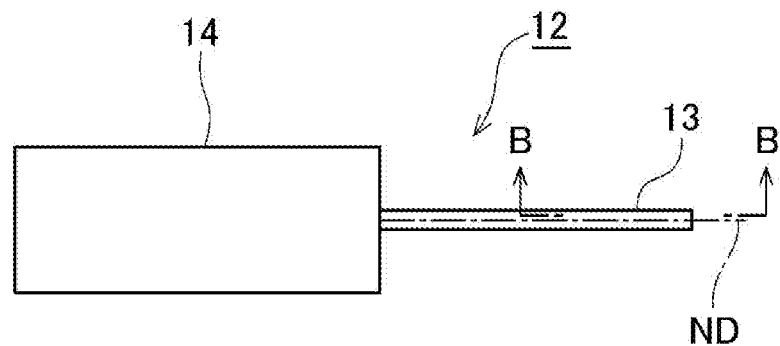

FIG. 4 is a side view of the nozzle moving mechanism 11. FIG. 5A is a side view of the vicinity of the nozzle portion 12 of the nozzle moving mechanism 11 and FIG. 5B is a plan view of the nozzle portion 12. In the present embodiment, the nozzle moving mechanism 11 is, for example, an industrial robot having a multi-jointed arm such as a 6-axis robot or a 7-axis robot. The nozzle moving mechanism 11 comprises a pedestal 11a, a base 11c, a long lower arm 11e and an upper arm 11g, and a distal end arm 11i.

The pedestal 11a is fixed to a horizontally provided floor surface FL. The base 11c is provided on the pedestal 11a so as to be rotatable within a horizontal plane with respect to the pedestal 11a about a first shaft portion 11b, which is provided perpendicularly to the floor surface FL.

One end of the lower arm 11e is connected to the base 11c by a horizontally provided second shaft portion 11d and the lower arm 11e is supported by the base 11c. The lower arm 11e is provided so as to be rotatable with respect to the base 11c about the second shaft portion 11d.

One end of the upper arm 11g is connected to the other end of the lower arm 11e by a third shaft portion 11f, which is provided orthogonally to the lower arm 11e. Consequently, the upper arm 11g is provided so as to be rotatable with respect to the lower arm 11e about the third shaft portion 11f and is supported by the lower arm 11e.

The distal end arm 11i is connected to the other end of the upper arm 11g by a fourth shaft portion 11h, which is provided orthogonally to the upper arm 11g. Consequently, the distal end arm 11i is provided so as to be rotatable with respect to the upper arm 11g about the fourth shaft portion 11h and is supported by the upper arm 11g.

The nozzle portion 12 is provided, to the distal end arm 11i, so as to be rotatable about an axis 11j of the distal end arm 11i, as illustrated in FIG. 5A.

Thus, the nozzle moving mechanism 11 is configured so as to comprise an arm composed of the lower arm 11e, the upper arm 11g, and the distal end arm The nozzle portion 12 is provided such that the position and the pose, that is, the angle, of the nozzle portion 12 with respect to the workpiece W provided within the cabinet 2 are modifiable through the rotation in the base 11c and the shaft portions 11b, 11d, 11f, 11h, 11j of the arms 11e, 11g, 11i.

A servo motor that is not illustrated is provided to each of the shafts 11b, 11d, 11f, 11h, 11j and is capable of outputting the rotation angle of the base 11c, the arms 11e, 11g, 11i, and the nozzle portion 12. The output signals of these servo motors are transmitted to the control apparatus 16 described below.

A jacket is mounted on the nozzle moving mechanism 11 to suppress collision from the shot material dispersed within the cabinet 2.

The nozzle portion 12 comprises the nozzle 13 and a servo motor 14. In the present embodiment, the nozzle portion 12 comprises one nozzle 13 formed to be long and one servo motor 14.

Figure 6:
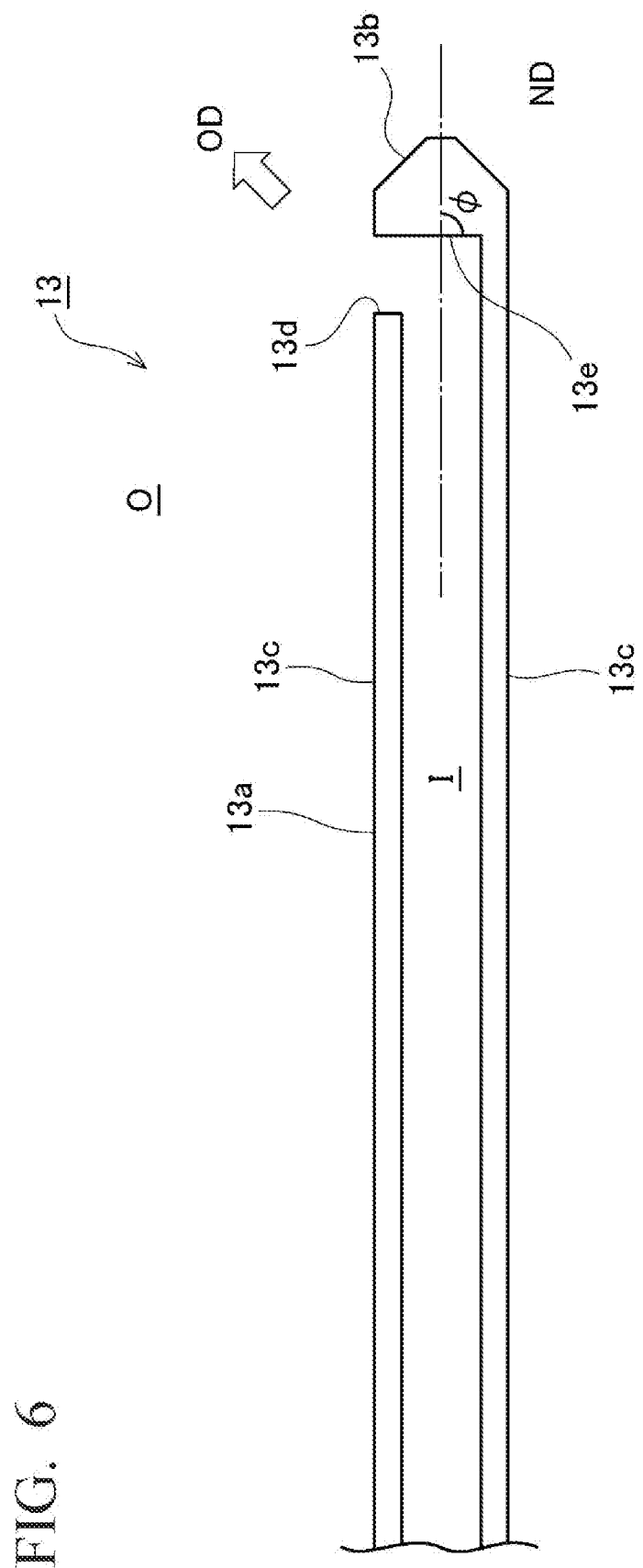
FIG. 6 is a cross-sectional view of a nozzle provided to the nozzle portion and is a cross-sectional view along B-B of FIG. 5B.

FIG. 6 is a cross-sectional view of the nozzle 13 and is a cross-sectional view along B-B of FIG. 5B. The nozzle 13 comprises a nozzle body 13a which has a cylindrical shape and which has a closed distal end 13b, and a through-hole 13d that communicates an interior I having the cylindrical shape with the outside O is opened in a side surface 13c of the distal end 13b. More specifically, the distal end 13b of the nozzle body 13a is closed by a distal end wall surface 13e provided so as to be substantially orthogonal to a central axis line ND of the nozzle body 13a. In other words, an angle $\varphi$ of the distal end wall surface 13e with respect to the central axis line ND of the nozzle 13 is substantially 90°.

The end of the previously described hose 4a opposite the ejection apparatus 4 is joined to the end of the nozzle body 13a opposite the distal end 13b. Consequently, after the shot material ejected from the ejection apparatus 4 reaches the interior I of the nozzle body 13a via the hose 4a, the shot material collides with and reflects off the distal end wall surface 13e, and is then ejected to the outside O from the through-hole 13d.

The distal end wall surface 13e is provided so as to be substantially orthogonal with respect to the central axis line ND of the nozzle 13, but because the shot material moves through the interior I of the nozzle body 13a at high speed, the momentum thereof causes the shot material to generally be ejected in an oblique forward direction OD. For this reason, when the nozzle 13 has been inserted into a hole Wb of the workpiece W, the shot material travels forward while irregularly reflecting off the inner wall of the hole Wb. Accordingly, when subjecting the inside of the holes Wb to a shot treatment using such a nozzle 13, there is no need to fully insert the nozzle 13 into the holes Wb.

In the present embodiment, the nozzle 13 has an outer diameter of about 7 mm, and the holes Wb as described above having an inner diameter of about 9 mm are subjected to a shot treatment by inserting the nozzle 13 into the holes Wb to a depth of about 150 mm while ejecting the shot material. For this reason, the clearance between the holes Wb and the nozzle 13 is only about 2 mm.

The servo motor 14 rotates the nozzle 13 in the circumferential direction about the central axis line ND. Because this causes the position of the through-hole 13d to rotate in the circumferential direction, the shot material is ejected towards various directions about the central axis line ND. The rotation angle of the servo motor 14 is transmitted to the control apparatus 16.

The control apparatus 16 is an information processing apparatus such as a personal computer or a control panel. The input apparatus 17 is, for example, a keyboard, a mouse, a touch panel, or an operation button provided corresponding to the control apparatus 16.

The control apparatus 16 is configured so as to be able to ascertain the amount of rotation in the shaft portions 11b, 11d, 11f, 11h, 11j through the servo motor provided to each portion of the nozzle moving mechanism 11 and the like. Consequently, the control apparatus 16 can precisely ascertain the current pose of the nozzle moving mechanism 11, that is, the spatial position and pose of the nozzle 13.

The control apparatus 16 is similarly configured so as to be able to ascertain the amount of rotation of the nozzle 13 from the servo motor 14 of the nozzle portion 12. Consequently, the control apparatus 16 can ascertain the position of the through-hole 13d of the nozzle 13, that is, the ejection direction of the shot material.

As previously described, the workpiece W installed on the turntable 3 is positioned to a certain extent by the positioning members 3c, but there are variations in the position and the pose of the workpiece W within the area of the gap provided between the workpiece W and the positioning members 3c.

Nevertheless, the shot treatment apparatus 1 inserts the nozzle 13 into the holes Wb of the workpiece W to subject the holes Wb to a shot treatment. Further, situations can also occur in which the clearance between the holes Wb and the nozzle 13 is only about 2 mm, as described above. For this reason, when the control apparatus 16 causes the nozzle 13 to always be arranged to be at a predefined spatial position and be inserted and moved in a predefined direction by means of the nozzle moving mechanism 11, the nozzle 13 may collide with the inner wall of the hole Wb and damage either or both the nozzle 13 and the workpiece W. To suppress this, the control apparatus 16 of the present embodiment ascertains the installed position and pose of the workpiece W by means of the three-dimensional information obtaining sensor 15 and adjusts the position and the pose of the nozzle 13 based thereon.

Below, the three-dimensional information obtaining sensor 15 will be described, and then more detailed processing contents of the control apparatus 16 will be described.

As illustrated in FIGS. 1 and 2, the three-dimensional information obtaining sensor 15 is provided at a height position, substantially identical to that of the workpiece W installed on the turntable 3, on the second wall 2b of the cabinet 2 opposite the first wall 2a where the turntable 3 is provided. The three-dimensional information obtaining sensor 15 three-dimensionally captures images of the workpiece W provided within the treatment compartment S1 to obtain position and pose information of the workpiece W. So as to not obstruct this capturing of images, the nozzle moving mechanism 11 is provided near a third wall 2e linking the first wall 2a and the second wall 2b of the cabinet 2 in the horizontal direction so as to not be positioned above a straight line L (see FIG. 2) linking the workpiece W and the three-dimensional information obtaining sensor 15.

The three-dimensional information obtaining sensor 15 comprises a sensor body 15a, a case 15b, and a shutter 15c. The sensor body 15a is for example a camera and performs imaging processing. The case 15b stores the sensor body 15a therein and isolates the sensor body 15a from the outside, that is, from the atmosphere within the cabinet 2. An opening 15d is opened in the case 15b. The shutter 15c is provided so as to be able to open and close this opening 15d. The shutter 15c is provided such that the opening 15d is set to be in an open state when capturing images of the workpiece W by means of the sensor body 15a. Due to such a configuration, when capturing images, the shutter 15c is set to be in an open state and the sensor body 15a can capture images of the workpiece W through the opening 15d.

In the present embodiment, the three-dimensional information obtaining sensor 15 comprises one sensor body 15a and a projector (not illustrated) provided at a different location than that of the sensor body 15a. Such a type of three-dimensional information obtaining sensor 15 three-dimensionally measures the target through triangulation by means of one sensor body 15a and one projector by projecting gray code patterns and phase shift patterns from the projector and then capturing images of those moments by means of the sensor body 15a.

The three-dimensional information obtaining sensor 15 is not so limited and may be of another form, such as a type that uses a projector and two cameras.

Figure 7:
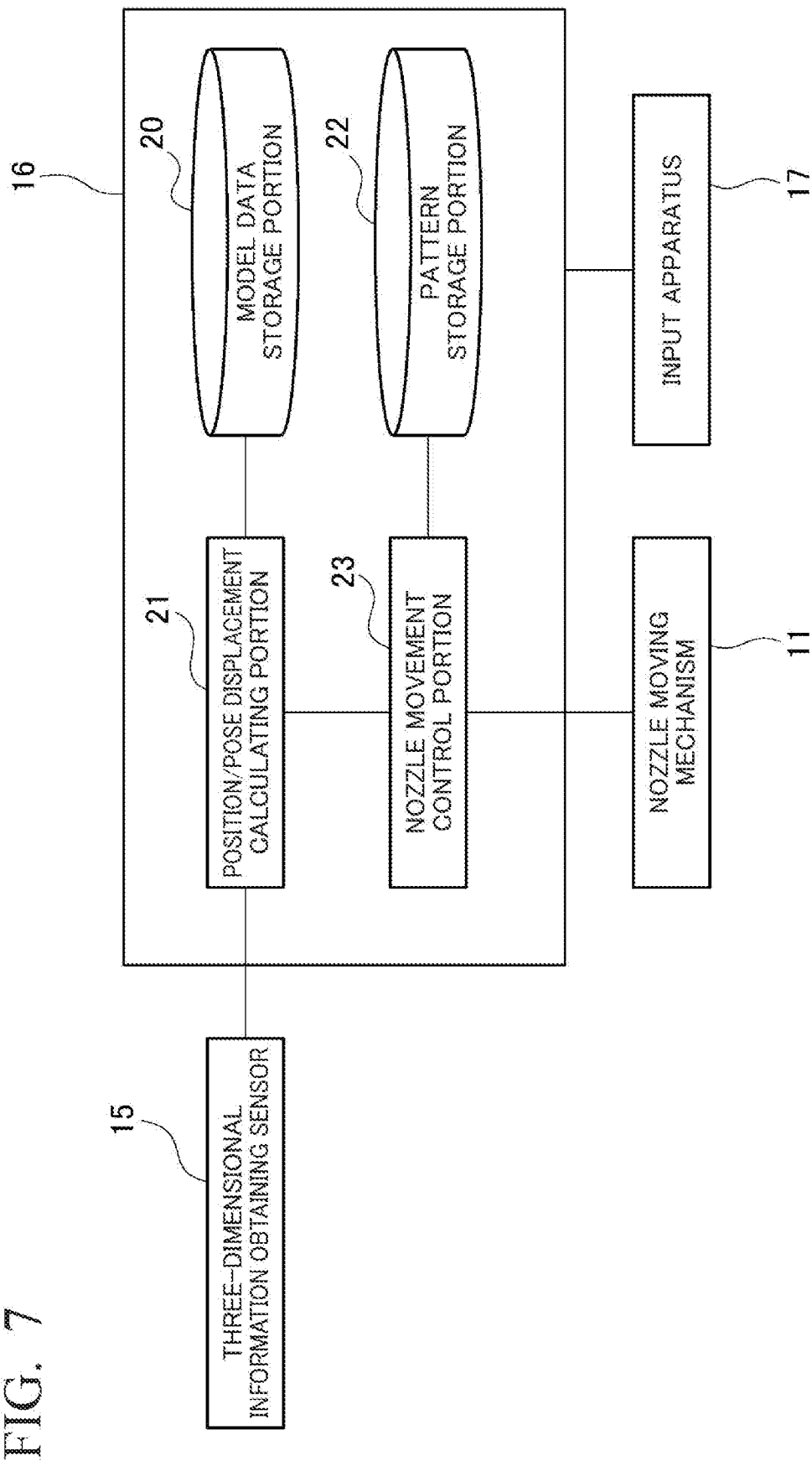
FIG. 7 is a block diagram of the shot treatment apparatus.

FIG. 7 is a block diagram of the shot treatment apparatus 1. The control apparatus 16 comprises a model data storage portion 20, a position/pose displacement calculating portion 21, a pattern storage portion 22, and a nozzle movement control portion 23.

Three-dimensional model data of the workpiece W is stored in the model data storage portion 20.

Figure 8:
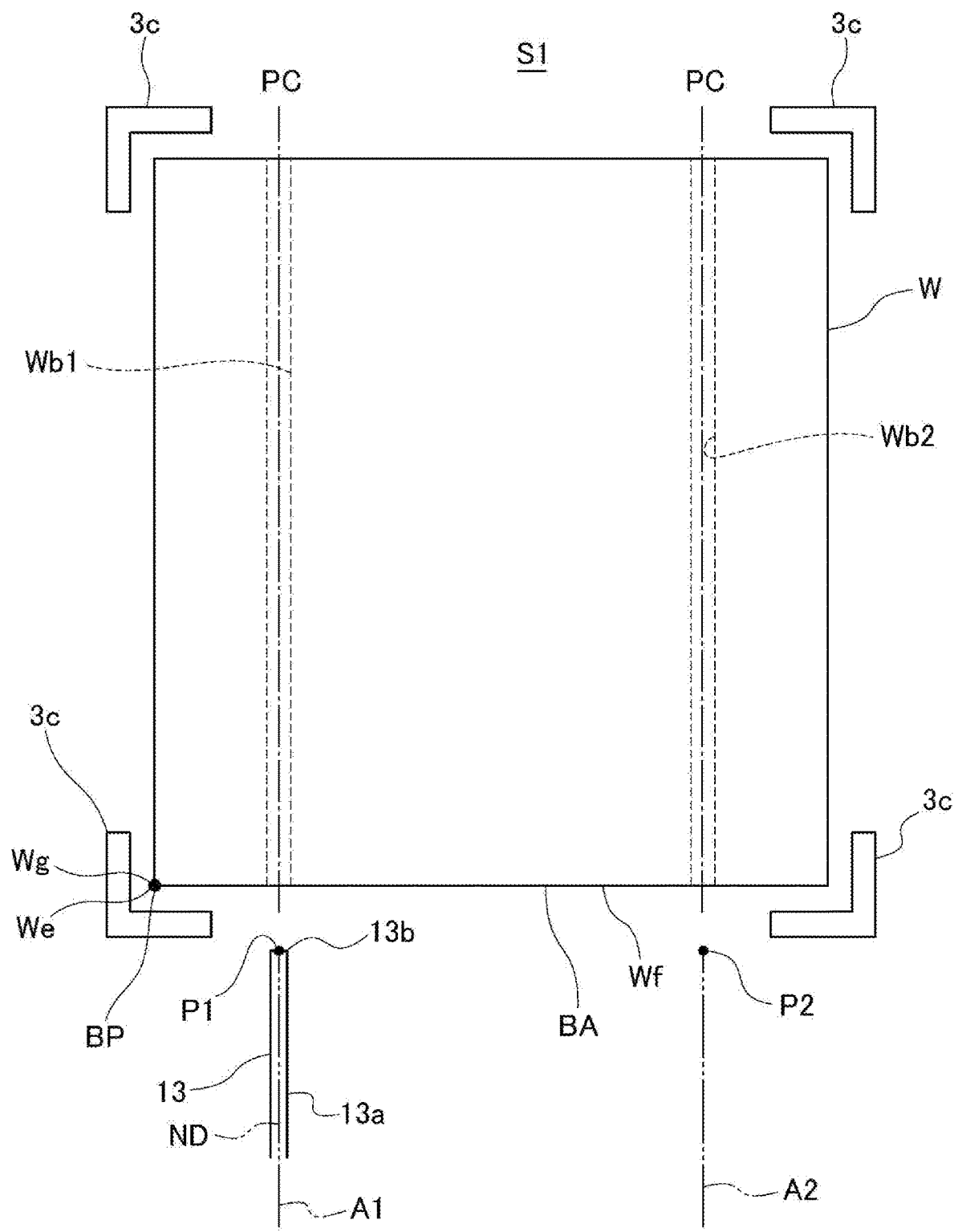
FIG. 8 is an explanatory view illustrating the relationship between a hole of a workpiece and a nozzle positioned with respect to the hole when the workpiece is installed at a reference position and a reference pose.

A reference operation pattern of the nozzle 13 when the workpiece W is installed at a reference position and a reference pose within the treatment compartment S1 is stored in the pattern storage portion 22. FIG. 8 is an explanatory view illustrating the relationship between holes Wb1, Wb2 of the workpiece W and the nozzle 13 positioned with respect to the holes Wb when the workpiece W is installed at a reference position and a reference pose. For simplicity of description, a case will be described in which the shot treatment apparatus 1 subjects two holes Wb1, Wb2, which are provided in the workpiece W so as to be spaced apart in the horizontal direction, to a shot treatment.

The reference operation pattern of the nozzle 13 is operation patterns of the nozzle moving mechanism 11 for subjecting both the holes Wb1, Wb2, which are shot treatment targets of the workpiece W, to a shot treatment.

For each of the holes Wb1, Wb2, shot treatment positions P1, P2 are set corresponding to each of the holes Wb1, Wb2 when subjecting these holes Wb1, Wb2 to a shot treatment. The shot treatment positions P1, P2 are coordinate values where the distal end 13b of the nozzle 13 is positioned with predetermined origin coordinates in three-dimensional space serving as a reference. Each of the shot treatment positions P1, P2 is set on a straight line extending along a central axis PC of each of the holes Wb1, Wb2 towards the side on which the nozzle 13 is positioned outside of the workpiece W in three-dimensional space, that is, in the treatment compartment Si.

In addition, pose angles A1, A2 of the nozzle 13 in the shot treatment positions P1, P2 are set corresponding to each of the holes Wb1, Wb2. The pose angles A1, A2 are angles of the central axis line ND of the nozzle 13 with respect to the straight line with a predetermined straight line in three-dimensional space serving as a reference. The pose angles A1, A2 of the nozzle 13 are set such that when the distal end 13b of the nozzle 13 is positioned at the shot treatment positions P1, P2, the central axis line ND of the nozzle body 13a is aligned with a straight line extending along the central axis line PC of each of the holes Wb1, Wb2 towards the side on which the nozzle 13 is positioned.

Shot treatment positions P1, P2 and pose angles A1, A2 of the nozzle 13 as described above are registered with respect to the holes Wb1, Wb2 in the reference operation pattern.

When the workpiece W is installed within the treatment compartment S1 on the turntable 3, the nozzle movement control portion 23 described below first positions the nozzle 13 such that the distal end 13b is positioned at the shot treatment position P1 and the pose angle A1 is aligned with the central axis line ND of the nozzle body 13a in order to subject the hole Wb1 to a shot treatment. Thereafter, the nozzle movement control portion 23 inserts the nozzle 13 into the hole Wb1 and performs the shot treatment. By setting the position and the pose of the nozzle 13 as described above, the nozzle 13 does not contact the inner wall of the hole Wb1 even when the nozzle 13 is inserted into the hole Wb1. When the shot treatment within the hole Wb1 ends, the nozzle movement control portion 23 withdraws the nozzle 13 from the hole Wb1, repositions the nozzle 13 such that the distal end 13b is positioned at the shot treatment position P1 and the pose angle A1 is aligned with the central axis line ND of the nozzle body 13a, moves the nozzle 13 towards the hole Wb2, and then positions the nozzle 13 such that the distal end 13b is positioned at the shot treatment position P2 and the pose angle A2 is aligned with the central line axis ND of the nozzle body 13a. Thereafter, the nozzle movement control portion 23 inserts the nozzle 13 into the hole Wb2 and performs a shot treatment. When the shot treatment within the hole Wb2 ends, the nozzle movement control portion 23 withdraws the nozzle 13 from the hole Wb2 and separates the nozzle 13 from the workpiece W.

A series of operation patterns such as those described above is registered as a reference operation pattern for the workpiece W. Thus, the reference operation pattern is constructed so as to subject the interior of the holes Wb1, Wb2 to a shot treatment.

In the present embodiment, the reference operation pattern is a program generated by means of teaching through a teach pendant (not illustrated) and the like for the nozzle moving mechanism 11 configured as an industrial robot.

In order for the nozzle 13 to not collide with the holes Wb1, Wb2 when the nozzle moving mechanism 11 is operated in accordance with the reference operation pattern as described above, the workpiece W needs to be installed at a predetermined position in a predetermined pose, more specifically, in the same state as the position and the pose in which the workpiece W was installed when the reference operation pattern was generated. The reference position and the reference pose within the treatment compartment S1 refer to this predetermined position and pose.

The reference position is, for example, coordinate values BP illustrated in FIG. 8 positioned to be surrounded by the positioning members 3c in three-dimensional space. In addition, the reference pose is an inclination angle of a straight line BA passing through the region surrounded by the positioning members 3c in three-dimensional space. For example in FIG. 8, when a specific point of the workpiece W such as the corner Wg positioned in the lower left of the drawing is aligned with the reference position BP as a reference point We and a specific side of the workpiece W such as a side Wf positioned near the bottom of the drawing is aligned with a reference pose BA as a reference side VVf, the workpiece W is considered to be installed in the reference position and the reference pose.

Thus, the reference position BP and the reference pose BA are set on the treatment compartment S1, and the reference operation pattern is constructed for the workpiece W installed so as to match the reference position BP and the reference pose BA.

Next, the position/pose displacement calculating portion 21 and the nozzle movement control portion 23 will be described. Here, each of the operations in the case illustrated as FIG. 9 will first be described, and then the operations in the case illustrated as FIG. 10 and FIG. 11 will be described.

Figure 9:
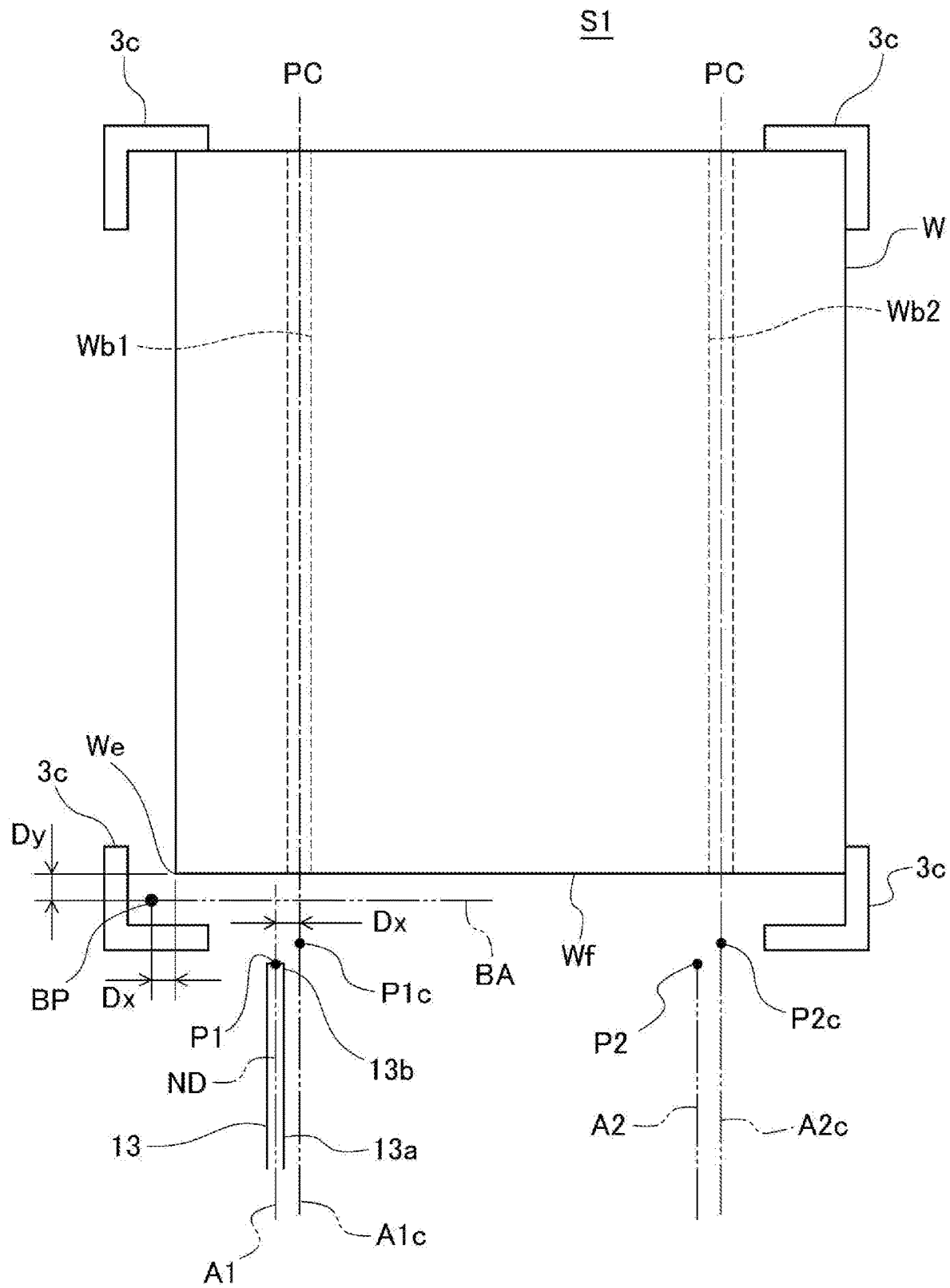
FIG. 9 is an explanatory view illustrating the relationship between a hole of a workpiece and a nozzle positioned with respect to the hole when the workpiece is installed offset from a reference position.

FIG. 9 is an explanatory view illustrating the relationship between the holes Wb1, Wb2 of the workpiece W and the nozzle 13 positioned with respect to the holes Wb1, Wb2 when the workpiece W is installed offset from the reference position BA. In FIG. 9, the workpiece W is moving while maintaining a pose, that is, a tilt, from the reference position BP towards the upper right of the drawing. More specifically, the workpiece W is displaced from the reference position BP a distance Dx towards the right and a distance Dy upwards in the drawing.

The three-dimensional information obtaining sensor 15 captures images of the workpiece W that is displaced as in FIG. 9 and transmits position and pose information to the position/pose displacement calculating portion 21. The position/pose displacement calculating portion 21 receives this position and pose information regarding the state in which the workpiece W is currently installed from the three-dimensional information obtaining sensor 15. The position/pose displacement calculating portion 21 obtains the three-dimensional model data corresponding to this workpiece W from the pattern storage portion 22 and generates reference position and pose data, which is data when this is provided at the reference position BP in the reference pose BA. By comparing this reference position and pose data and the received position and pose information, the position/pose displacement calculating portion 21 calculates the displacement in the position and pose of the workpiece W from the reference position and pose data.

In the case in FIG. 9, distances Dx, Dy and the direction of displacement of each of these distances are calculated as the position from the reference position BP. In this case, because the tilt of the workpiece W is maintained, it is calculated that there is no displacement of the pose.

The comparison as described above can, for example, be performed based on the specific extent to which a feature point registered corresponding to the three-dimensional model data aligns with a feature point extracted from the position and pose information. Feature points that can be employed, for example in the case of a cylinder block such as that illustrated in FIG. 3, include the external outline shape and the outline shape of the cylinder bores Wa. For example, when these outline shapes are compared with the reference position and pose data and the position and pose information received from the three-dimensional information obtaining sensor 15 and the total length of the portions that are aligned with each other is greater than a predetermined threshold, the matching rate of the data is determined to be high and the position and pose of the workpiece W can be identified.

Thus, in the present embodiment, outline shapes are extracted from position and pose information obtained by means of the three-dimensional information obtaining sensor 15 and three-dimensionally compared with reference position and pose data, that is, three-dimensional model data. For this reason, when for example there is a defect such as chipping on the outline portion of the workpiece W, this can be detected.

The position/pose displacement calculating portion 21 transmits the calculated displacement in the position and the pose of the workpiece W to the nozzle movement control portion 23.

The position/pose displacement calculating portion 21 was described as being able to be provided within the control apparatus 16 in the present embodiment, but for example, a function corresponding to the position/pose displacement calculating portion 21 may be implemented as a processing system within the three-dimensional information obtaining sensor 15.

The nozzle movement control portion 23 receives the displacement in the position and pose of the workpiece W from the position/pose displacement calculating portion 21. The nozzle movement control portion 23 corrects, based thereon, the reference operation pattern of the nozzle 13 and controls the nozzle moving mechanism 11 to move the nozzle 13 based on the corrected reference operation pattern.

For example, in the case of the hole Wb1 in FIG. 9, the nozzle movement control portion 23 calculates a corrected shot treatment position P1c, which is obtained by correcting the shot treatment position P1 of the hole Wb1 by adding thereto the distances Dx and Dy in each corresponding direction.

In addition, the nozzle movement control portion 23 calculates a corrected pose angle A1c, which is obtained by similarly correcting the pose angle A1 with respect to the hole Wb1 by adding thereto the displacement in the pose. In this case, because there is no displacement in the pose of the workpiece W, the pose angle A1 is not corrected, resulting in the pose angle A1 and the corrected pose angle A1c being the same.

The nozzle movement control portion 23 similarly calculates a corrected shot treatment position P2c and a corrected pose angle A2c for the hole Wb2.

The nozzle movement control portion 23 corrects the reference operation pattern by replacing each of the shot treatment positions P1, P2 and pose angles A1, A2 within the reference operation pattern with the corrected shot treatment positions P1c, P2c and the corrected pose angles A1c, A2c.

In accordance with the reference operation pattern that was corrected in this manner, the nozzle movement control portion 23 operates the nozzle moving mechanism 11, moves the nozzle 13, and subjects the holes Wb1, Wb2 to a shot treatment.

Thus, the nozzle movement control portion 23 corrects the spatial coordinate values P1, P2 of the shot treatment positions P1, P2 and the pose angles A1, A2 based on the displacement in the position and pose of the workpiece W and corrects the reference operation pattern. For this reason, the spatial coordinate values P1, P2 and the pose angles A1, A2 of the nozzle 13 are corrected such that the central axis line ND of the nozzle 13 aligns with the central axis line PC of the holes Wb1, Wb2.

Figure 10:
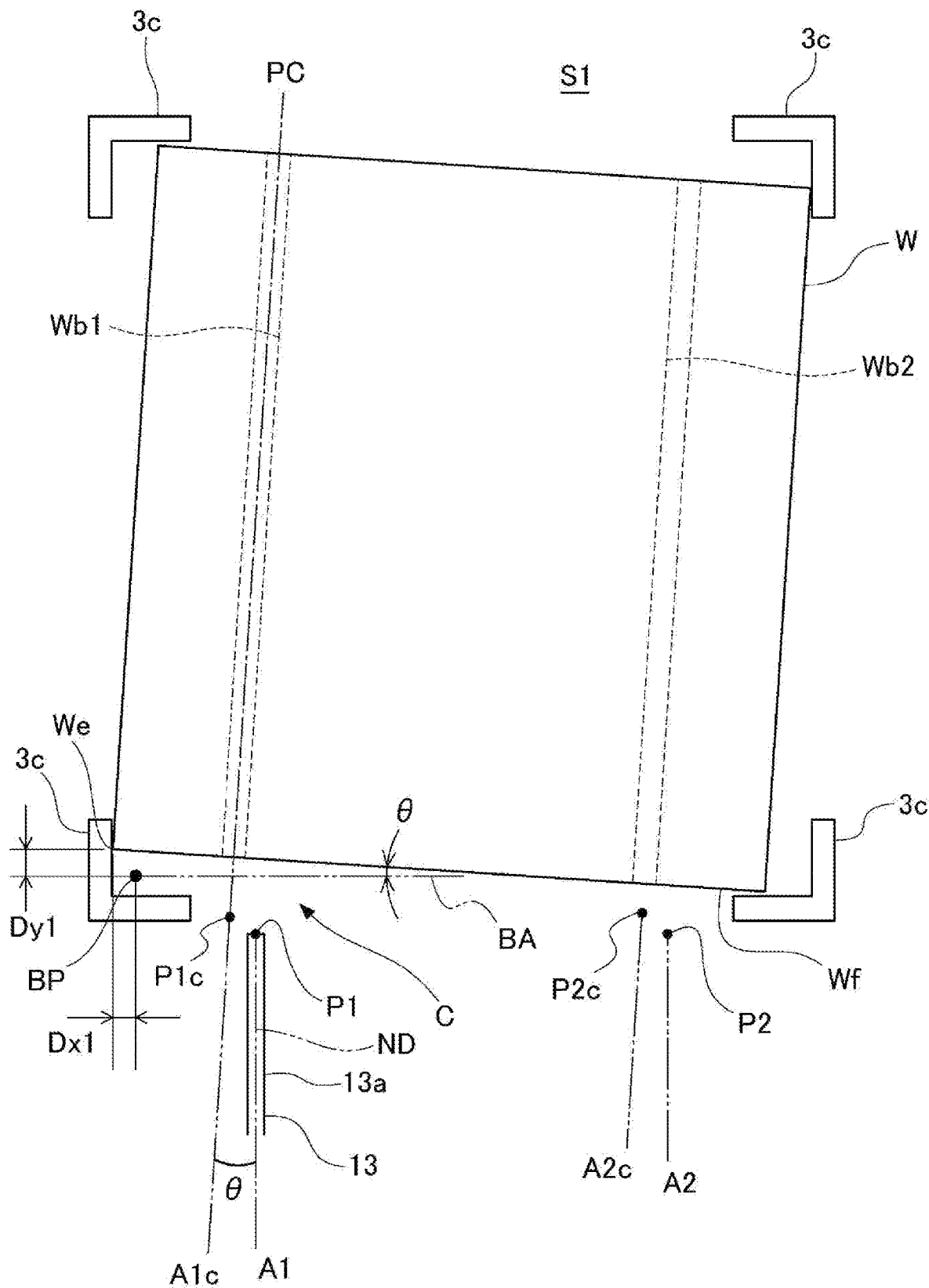
FIG. 10 is an explanatory view illustrating the relationship between a hole of a workpiece and a nozzle positioned with respect to the hole when the workpiece is installed tilted from a reference pose.

FIG. 10 is an explanatory view illustrating the relationship between the holes Wb1, Wb2 of the workpiece W and the nozzle 13 positioned with respect to the holes Wb1, Wb2 when the workpiece W is installed tilted from the reference pose BA. In FIG. 10, the workpiece W rotates clockwise in the drawing. Consequently, the reference point We of the workpiece W is displaced a distance Dx1 to the left and a distance Dy1 upwards in the drawing from the reference position BP and the reference side Wf of the workpiece W is displaced an angle θ from the reference pose BA.

In the case in FIG. 10, the distances Dx1, Dy1 and the direction of displacement of each of these distances are calculated as the position from the reference position BP in the position/pose displacement calculating portion 21. In addition, a tilt angle θ from the reference pose BA is calculated as the position from the reference pose BA.

The position/pose displacement calculating portion 21 transmits the calculated displacement in the position and the pose of the workpiece W to the nozzle movement control portion 23.

The nozzle movement control portion 23 receives the displacement in the position and the pose of the workpiece W from the position/pose displacement calculating portion 21. The nozzle movement control portion 23 corrects, based thereon, the reference operation pattern of the nozzle 13 and controls the nozzle moving mechanism 11 to move the nozzle 13 based on the corrected reference operation pattern.

Figure 11:
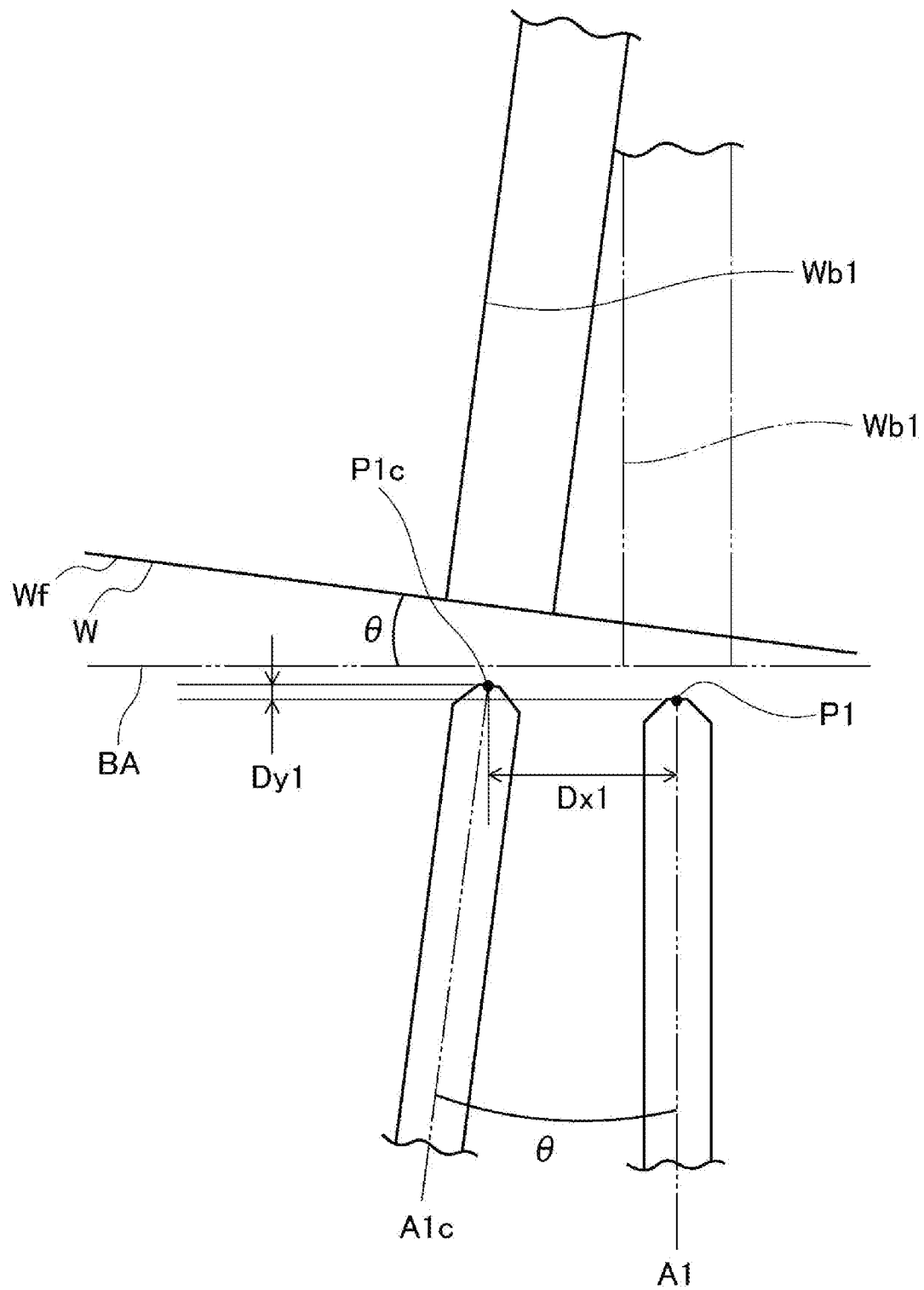
FIG. 11 is an explanatory view describing a correction of the position and pose of the nozzle in the case of FIG. 10 and is an enlarged view of the portion indicated by arrow C of FIG. 10.

For example, in the case of the hole Wb1 illustrated in FIG. 10 and in FIG. 11 as an enlarged view of the portion indicated by arrow C of FIG. 10, the nozzle movement control portion 23 calculates a corrected shot treatment position P1c, which is obtained by correcting the shot treatment position P1 of the hole Wb1 by adding thereto the distances Dx1 and Dy1 in each corresponding direction.

In addition, the nozzle movement control portion 23 calculates a corrected pose angle A1c, which is obtained by correcting the pose angle A1 with respect to the hole Wb1 by adding thereto an angle θ in the corresponding direction.

The nozzle movement control portion 23 similarly calculates a corrected shot treatment position P2c and a corrected pose angle A2c for the hole Wb2.

The nozzle movement control portion 23 corrects the reference operation pattern by replacing each of the shot treatment positions P1, P2 and pose angles A1, A2 within the reference operation pattern with the corrected shot treatment positions P1c, P2c and corrected pose angles A1c, A2c.

In accordance with the reference operation pattern that was corrected in this manner, the nozzle movement control portion 23 operates the nozzle moving mechanism 11, moves the nozzle 13, and subjects the holes Wb1, Wb2 to a shot treatment.

Thus, in a case such as FIG. 10 as well, the nozzle movement control portion 23 corrects the spatial coordinate values P1, P2 of the shot treatment positions P1, P2 and the pose angles A1, A2 based on the displacement in the position and pose of the workpiece W and corrects the reference operation pattern. For this reason, the spatial coordinate values P1, P2 and the pose angles A1, A2 of the nozzle 13 are corrected such that the central axis line ND of the nozzle 13 aligns with the central axis line PC of the holes Wb1, Wb2.

In the present embodiment, the shot treatment apparatus 1 is configured so as to be able to subject a plurality of types of the workpiece W to a shot treatment. More specifically, the reference operation pattern and the three-dimensional model data are constructed corresponding to each of the plurality of types of the workpiece W and are respectively stored in the pattern storage portion 22 and the model data storage portion 20.

In addition, different treatment conditions are registered corresponding to each of this plurality of workpieces W in the control apparatus 16. Treatment conditions are parameters for when a shot treatment is performed for the workpiece W and the like. Treatment conditions that can be contemplated include, for example, the insertion speed of the nozzle 13 with respect to the holes Wb, the time for performing a shot treatment for each hole Wb, the rotation speed of the nozzle 13 by means of the servo motor 14, the ejected amount of shot material from the nozzle 13, and the operation settings of the three-dimensional information obtaining sensor 15.

In such a configuration, the input apparatus 17 receives, from the worker M, inputs relating to the type of workpiece W that is currently the shot treatment target from among the plurality of types of workpieces W.

The inputted information is transmitted to the control apparatus 16, the reference operation pattern and the three-dimensional model data corresponding to this workpiece W are respectively obtained from the pattern storage portion 22 and the model data storage portion 20, and then used for the above-mentioned treatment.

In the control apparatus 16, the types of treatment conditions corresponding to this workpiece W are further obtained and applied as parameters during the shot treatment.

Next, a shot treatment method using the above-mentioned shot treatment apparatus will be described using FIGS. 1-11 and 12. Here, in particular, the operation of the turntable 3, the nozzle moving mechanism 11, and the three-dimensional information obtaining sensor 15 within the cabinet 2 and the processing in the control apparatus 16 will mainly be described. FIG. 12 is a flow chart of the shot treatment method in the present embodiment.

When the treatment is started (step S1), the worker M installs a workpiece W to be subjected to a shot treatment on the top surface 3a of the turntable 3 in the installation compartment S2 (step S3).

Then, the turntable 3 rotates 180° about the axis C and the installed workpiece W moves to the treatment compartment S1, which is the compartment on the second wall 2b side (step S5). At this time, the nozzle moving mechanism 11 is at a position and a pose such that the parts of the nozzle moving mechanism 11, including the nozzle portion 12, do not interfere with the rotation of the turntable 3 and the workpiece W installed thereon.

While this workpiece W that has moved to the treatment compartment S1 is being subjected to the shot treatment, the worker M installs a workpiece W to be treated next on the top surface 3a of the turntable 3 in the installation compartment S2.

In this manner, the installation of workpieces W and the shot treatment are repeated in parallel.

When the workpiece W moves to the treatment compartment S1, the three-dimensional information obtaining sensor 15 captures images of the workpiece W (step S7). More specifically, the shutter 15c opens and sets the opening 15d to be in an open state, the sensor body 15a captures images of the workpiece W through the opening 15d, and then the shutter 15c closes and sets the opening 15d to be in a closed state.

The three-dimensional information obtaining sensor 15 obtains position and pose information of the workpiece W by capturing images of the workpiece W and transmits the information to the position/pose displacement calculating portion 21.

The position/pose displacement calculating portion 21 receives the position and pose information regarding the state in which the workpiece W is currently installed from the three-dimensional information obtaining sensor 15. The position/pose displacement calculating portion 21 obtains the three-dimensional model data corresponding to this workpiece W from the pattern storage portion 22 and generates reference position and pose data, which is data in the case in which this is provided at the reference position BP in the reference pose BA. By comparing this reference position and pose data and the position and pose information received from the three-dimensional information obtaining sensor 15, the position/pose displacement calculating portion 21 calculates the displacement in the position and pose of the workpiece W from the reference position and pose data (step S9).

The position/pose displacement calculating portion 21 transmits the calculated displacement in the position and pose of the workpiece W to the nozzle movement control portion 23.

The nozzle movement control portion 23 receives the displacement in the position and the pose of the workpiece W from the position/pose displacement calculating portion 21. The nozzle movement control portion 23 corrects, based thereon, the reference operation pattern of the nozzle 13

(step S11) and controls the nozzle moving mechanism 11 to move the nozzle 13 based on the corrected reference operation pattern (step S13).

In this manner, the workpiece W in the treatment compartment S1 is subjected to the shot treatment.

When the shot treatment ends, the nozzle moving mechanism 11 is operated to be at a position and a pose that does not interfere with the rotation of the workpiece W, the turntable 3 rotates, and the workpiece W that was subjected to the shot treatment moves to the treatment compartment S1 (step S15).

Thereafter, the worker M collects the workpiece W that was subjected to the shot treatment (step S17).

Next, the effects of the above-mentioned shot treatment apparatus 1 and shot treatment method will be described.

The shot treatment apparatus 1 of the present embodiment is a shot treatment apparatus 1 that ejects shot material from a nozzle 13 towards a workpiece W to subject the workpiece W to a shot treatment, the shot treatment apparatus 1 comprising: the nozzle 13; a nozzle moving mechanism 11 to which the nozzle 13 is fixed and which is capable of modifying a position and a pose of the nozzle 13 with respect to the workpiece W; and a three-dimensional information obtaining sensor 15 that three-dimensionally captures an image of the workpiece W provided within a treatment compartment S1 to obtain position and pose information of the workpiece W; the shot treatment apparatus 1 further comprising: a pattern storage portion 22 in which is stored a reference operation pattern of the nozzle 13 when the workpiece W is installed at a reference position BP and a reference pose BA within the treatment compartment S1; a model data storage portion 20 in which is stored three-dimensional model data of the workpiece W; a position/pose displacement calculating portion 21 that compares the position and pose information obtained by means of the three-dimensional information obtaining sensor 15 and reference position and pose data when the three-dimensional model data is provided at the reference position BP in the reference pose BA to calculate a displacement in a position and pose of the workpiece W from the reference position and pose data; and a nozzle movement control portion 23 that corrects the reference operation pattern of the nozzle 13 based on the displacement in the position and pose and controls the nozzle moving mechanism 11 to move the nozzle 13 based on the corrected reference operation pattern.

In addition, the shot treatment method of the present embodiment is a shot treatment method wherein shot material is ejected from a nozzle 13 towards a workpiece W to subject the workpiece W to a shot treatment, the method comprising: storing a reference operation pattern of the nozzle 13, performed by a nozzle moving mechanism 11 to which the nozzle 13 is fixed and which is capable of modifying a position and a pose of the nozzle 13 with respect to the workpiece W, when the workpiece W is installed at a reference position BP and a reference pose BA within a treatment compartment S1; storing three-dimensional model data of the workpiece W; obtaining position and pose information of the workpiece W by means of a three-dimensional information obtaining sensor 15 that three-dimensionally captures an image of the workpiece W provided within the treatment compartment S1; comparing the position and pose information obtained by means of the three-dimensional information obtaining sensor 15 and reference position and pose data when the three-dimensional model data is provided at the reference position BP in the reference pose BA and calculating a displacement in a position and pose of the workpiece W from the reference position and pose data; and correcting the reference operation pattern of the nozzle 13 based on the displacement in the position and pose and controlling the nozzle moving mechanism 11 to move the nozzle 13 based on the corrected reference operation pattern.

According to the configuration and the method as described above, the reference position and pose data, when the three-dimensional model data of the workpiece W is provided at the reference position BP in the reference pose BA, and the position and pose information of the workpiece W, obtained by images of the workpiece W being captured by means of the three-dimensional information obtaining sensor 15, both comprise three-dimensional information within the treatment compartment S1 space. For this reason, it is possible to calculate not only the displacement in the position and the tilt of the workpiece W on a plane orthogonal to the straight line L linking the three-dimensional information obtaining sensor 15 and the workpiece W, but also the displacement in the position and the tilt of the workpiece W in the direction in which the straight line L extends by comparing the position and pose information of the workpiece W obtained by means of the three-dimensional information obtaining sensor 15 with the reference position and pose data.

The reference operation pattern of the nozzle 13 when the workpiece W is installed at the reference position BP and the reference pose BA within the treatment compartment S1 is corrected based on the displacement in the position and pose calculated in this manner, and the nozzle moving mechanism 11 moves the nozzle 13 based on the corrected reference operation pattern. For this reason, it is possible to move the nozzle 13 into the vicinity of the workpiece W to perform a shot treatment while suppressing collision between the nozzle 13 and the workpiece W, even when the workpiece W is installed at an offset position on or is tilted to the three-dimensional information obtaining sensor 15 side, that is, on the side where the nozzle moving mechanism 11 is located, in the direction in which the straight line L linking the three-dimensional information obtaining sensor 15 and the workpiece W extends.

When the workpiece W is installed at an offset position on or is tilted to the side away from the three-dimensional information obtaining sensor 15, that is, in the direction opposite the nozzle moving mechanism 11, in the direction in which the straight line L linking the three-dimensional information obtaining sensor 15 and the workpiece W extends, the gap between the workpiece 13 and the nozzle W will increase more than needed unless the position of the nozzle 13 is corrected. The area of the workpiece W surface that is subjected to a shot treatment increases the farther the distal end 13b of the nozzle 13 is from the workpiece W, so in the case as described above, shot material may disperse to locations of the workpiece W where the shot treatment is not needed, or even to locations where the shot treatment is not desired, and subject such locations to the shot treatment.

According to the configuration as described above, it is possible to correct the position of the nozzle 13 so as to decrease the spaced distance between the workpiece W and the nozzle 13, even when the workpiece W is installed at an offset position on or is tilted to the side away from the three-dimensional information obtaining sensor 15. For this reason, it is possible to suppress shot treatment of locations where a shot treatment is not required.

As described above, the shot treatment apparatus 1 of the present embodiment can appropriately correct the position of the nozzle 13 even when the workpiece W is installed at an offset position or is tilted. In other words, this illustrates that the shot treatment apparatus 1 can appropriately subject the workpiece W to a shot treatment even when the worker M for example installs the workpiece W at a position displaced from the reference position BP and the reference pose BA without precisely installing the workpiece W so as to be positioned at the reference position BP and the reference pose BA. For this reason, the worker M does not need to pay excessive attention to the positioning of the workpiece W when installing the workpiece W on the turntable 3. Therefore, according to the configuration as described above, the workability of workpiece W installation work is improved.

In addition, holes Wb are opened in the workpiece W, and the reference operation pattern is constructed so as to subject the interior of the holes Wb to a shot treatment.

According to the configuration as described above, the nozzle 13 can be moved into and positioned in the vicinity of the holes Wb of the workpiece W so as to not collide with the workpiece W. For this reason, it is possible to effectively subject the interior of the holes Wb of the workpiece W to the shot treatment.

In addition, spatial coordinate values P1, P2 of shot treatment positions P1, P2 and pose angles A1, A2 of the nozzle 13 in the shot treatment positions P1, P2 set corresponding to the holes Wb when subjecting the holes Wb to a shot treatment are registered in the reference operation pattern, and the nozzle movement control portion 23 corrects the spatial coordinate values P1, P2 of the shot treatment positions P1, P2 and the pose angles A1, A2 based on the displacement in the position and pose and moves the nozzle 13 to the position and pose of the corrected spatial coordinate values P1c, P2c and pose angles A1c, A2c.

According to the configuration as described above, it is possible to effectively suppress collision between the nozzle 13 and the workpiece W.

In addition, the nozzle 13 is formed to be long, and the spatial coordinate values P1, P2 and the pose angles A1, A2 are corrected such that the central axis line ND of the nozzle 13 aligns with the central axis line PC of the holes Wb.

According to the configuration as described above, the spatial coordinate values P1, P2 of the shot treatment positions P1, P2 and the pose angles A1, A2 are corrected such that the central axis line ND of the nozzle 13 formed to be long aligns with the central axis line PC of the holes Wb. Accordingly, the nozzle 13 is less likely to collide with the holes Wb even when the nozzle 13 is inserted into and withdrawn from the holes Wb while the nozzle 13 is positioned at the spatial coordinate values P1c, P2c and the pose angles A1c, A2c that were corrected in this manner.

As described in the above-mentioned embodiment, there are cases in which, for example, the nozzle 13 having an outer diameter of 7 mm needs to be inserted into holes Wb having an inner diameter of 9 mm to a depth of 150 mm. In this case, the clearance between the holes Wb and the nozzle 13 is only 2 mm, and it is essentially not easy to insert the nozzle 13 to a depth of 150 mm without colliding with the holes Wb in this state.

In the present embodiment, it is possible to suppress the nozzle 13 from colliding with the holes Wb, even under such difficult work conditions, by providing a configuration that makes the nozzle 13 less likely to collide with the holes Wb even when the nozzle 13 is inserted into and withdrawn from the holes Wb as described above.

In addition, the nozzle 13 comprises a nozzle body 13a which has a cylindrical shape and which has a closed distal end 13b, and a through-hole 13d that communicates an interior I having the cylindrical shape with the outside O is opened in a side surface 13c of the distal end 13b.

According to the configuration as described above, it is possible to effectively subject the interior surface of the holes Wb to a shot treatment with the nozzle 13 inserted into the hole Wb.

In addition, the workpiece W is a cylinder block for an internal combustion engine and the holes Wb are ducts that circulate a coolant.

According to the configuration as described above, it is possible to effectively subject the coolant ducts of a cylinder block to a shot treatment.

In addition, the three-dimensional information obtaining sensor 15 comprises a sensor body 15a, a case 15b which stores the sensor body 15a and isolates the sensor body 15a from the outside and which comprises an opening 15d, and a shutter 15c provided so as to be able to open and close the opening 15d, and the sensor body 15a captures images of the workpiece W through the opening 15d and the shutter 15c is set to be in an open state when capturing images of the workpiece W by means of the sensor body 15a.

According to the configuration as described above, the case 15b and the shutter 15c make it possible to shield the sensor body 15a from the outside, that is, from the dusty atmosphere within the cabinet 2 characteristic of the shot blasting treatment. Consequently, it is possible to protect the sensor body 15a and suppress erroneous detection and reduced accuracy due to degradation of the sensor body 15a.

In addition, the shutter 15c is provided so as to be set in an open state when capturing images of the workpiece W by means of the sensor body 15a and thus does not become an obstacle when capturing images of the workpiece W while still protecting the sensor body 15a as described above.

In addition, the position/pose displacement calculating portion 21 detects defects in the workpiece W by three-dimensionally comparing outline shapes when comparing the position and pose information obtained by means of the three-dimensional information obtaining sensor 15 and the reference position and pose data.

According to the configuration as described above, it is possible to detect defects in the workpiece W with high accuracy and to suppress the defective workpiece from affecting later-stage processes.

In particular, in the present embodiment, because this defect detection is executed prior to a shot treatment, it is possible to avoid executing wasteful shot treatments for a defective workpiece W.

Further, it becomes possible to track the cause of defects by for example providing the results from this defect detection as feedback to a step located at the preceding stage of the shot treatment apparatus 1 or before.

In addition, configured to be capable of subjecting a plurality of types of the workpiece W to a shot treatment, the reference operation pattern and the three-dimensional model data are provided corresponding to each of the plurality of types of the workpiece W.

According to the configuration as described above, it is possible to perform a shot treatment for a plurality of types of the workpiece W by switching the data of the workpiece W that is the shot treatment target.

In addition, an input apparatus 17 that receives inputs relating to the type of the workpiece W that is currently the shot treatment target from among the plurality of types of the workpiece W is provided and treatment conditions for when a shot treatment is performed on the workpiece W are stored corresponding to the workpiece W.

Treatment conditions such as the movement path of the nozzle 13 and the insertion speed thereof with respect to the holes Wb, the rotation speed of the nozzle 13, and the ejected amount of shot material can be set depending on the workpiece W.

According to the configuration as described above, when the type of the workpiece W that is the shot treatment target is inputted by means of the input apparatus 17, the treatment conditions corresponding to the type can easily be set by reading the treatment conditions that were stored corresponding to the type of the workpiece W.

In addition, the nozzle moving mechanism 11 is an industrial robot having an arm.

Further, the reference operation pattern is a program generated by means of teaching.

According to the configuration as described above, it is possible to appropriately implement the shot treatment apparatus 1 and the shot treatment method as described above.

The shot treatment apparatus 1 and the shot treatment method of the present invention are not to be construed as being limited to the embodiment mentioned above that was described with reference to drawings, and various other modified examples may be contemplated within the technical scope thereof.

For example, in the above-mentioned embodiment, the workpiece W was a cylinder block, but needless to say, the workpiece W does not have to be a cylinder block.

In particular, in the above-mentioned embodiment, the shot treatment apparatus 1 subjects the interior of the holes Wb of the workpiece W to a shot treatment, but the present invention is not so limited. For example, needless to say, the shot treatment apparatus 1 can be applied to surfaces of shapes that are difficult for the shot material to reach in a typical shot treatment, such as recesses and recessed strips formed in the surface of the workpiece W. In the above-mentioned embodiment, a long nozzle 13 is used, but when the shot treatment target is not a hole Wb, the shape and form of the nozzle 13 can be modified, as appropriate, in accordance with the shape of the shot treatment target.

In addition, in the above-mentioned embodiment, the nozzle portion 12 comprises one nozzle 13 and one servo motor 14, but the present invention is not so limited. For example, the nozzle portion 12 may comprise two nozzles 13 and two servo motors 14 corresponding to each of these nozzles 13. In this case, the two nozzles 13 may be provided parallel to each other at a distance equal to the distance between the holes Wb of the workpiece W. Consequently, it is possible for the shot treatment apparatus 1 to simultaneously subject two holes Wb of the workpiece W to a shot treatment, thus improving treatment efficiency.

In addition, in the above-mentioned embodiment, the distal end wall surface 13e of the nozzle 13 is provided so as to be substantially orthogonal to the central axis line ND of the nozzle body 13a, but the present invention is not so limited. For example, the distal end wall surface 13e may be provided to be tilted with respect to the central axis line ND of the nozzle 13 by the angle φ of the distal end wall surface 13e with respect to the central axis line ND of the nozzle 13 being, for example, 45°.

For example, when the angle φ is set as an acute angle in this manner, there are cases when the shot material that travels through the interior I of the nozzle body 13a towards the distal end wall surface 13e is more easily directed in the oblique forward direction OD after colliding with the distal end wall surface 13e.

In addition, in the above-mentioned embodiment, the three-dimensional information obtaining sensor 15 is provided on the second wall 2b of the cabinet 2 opposite the first wall 2a where the turntable 3 is provided, but instead, the three-dimensional information obtaining sensor 15 may be provided at any position on the arm of the industrial robot constituting the nozzle moving mechanism 11. In this case, when the three-dimensional information obtaining sensor 15 captures images of the workpiece W, the arm of the nozzle moving mechanism 11 is moved to a predetermined image-capturing position and image-capturing pose.

In addition, in the above-mentioned embodiment, when the displacement in the position and pose of the workpiece W was being described using FIG. 8-11, a case in which the workpiece W moved and rotated within the plane forming the top surface 3a of the turntable 3 was mainly described, but the present invention is not so limited. For example, needless to say, even when the bottom surface of the workpiece W partially moves away from the top surface 3a and the workpiece W is positioned so as to be tilted with respect to the top surface 3a such that the upper side of the workpiece W moves closer towards or is spaced apart from the three-dimensional information obtaining sensor 15, it is possible to adjust the position and pose of the nozzle 13 by means of a process similar to that of the above-mentioned embodiment.

In addition, in the above-mentioned embodiment, the type of workpiece W that is the shot treatment target is designated by means of manual inputs by the worker M to the input apparatus 17, but the present invention is not so limited. For example, the discrimination of the workpiece W type may be performed automatically by using a camera that reads 3D shapes, a two-dimensional bar code reader that reads a two-dimensional bar code provided to the workpiece W, and the like as the input apparatus 17.

In this case, the three-dimensional information obtaining sensor 15 may function as a camera that reads 3D shapes as described above. In other words, when the three-dimensional information obtaining sensor 15 obtains position and pose information of the workpiece W, the workpiece W type may be identified by identifying the shape of the workpiece W and then comparing with each of the models stored in the model data storage portion 20.

Aside from the above, it is possible to select whether to add or remove the configurations indicated in the above-mentioned embodiments and to appropriately modify the configurations to other configurations without departing from the spirit of the present invention.

REFERENCE SIGNS LIST

1 Shot treatment apparatus
2 Cabinet
3 Turntable
3c Positioning member
11 Nozzle moving mechanism
12 Nozzle
13a Nozzle body
13b Distal end
13c Side surface
13d Through-hole
15 Three-dimensional information obtaining sensor
15a Sensor body
15b Case
15c Shutter
15d Opening
16 Control apparatus
17 Input apparatus
20 Model data storage portion 21 Position/pose displacement calculating portion
22 Pattern storage portion
23 Nozzle movement control portion
S1 Treatment compartment
S2 Installation compartment
W Workpiece
Wb Hole
PC Central axis line of hole
ND Central axis line of nozzle
I Nozzle interior
O Nozzle exterior
P1, P2 Shot treatment position and spatial coordinate values of shot treatment position
P1c, P2c Corrected shot treatment position
A1, A2 Pose angle
A1c, A2c Corrected pose angle
BP Reference position
BA Reference pose

The invention claimed is:

1. A shot treatment apparatus that ejects shot material from a nozzle towards a workpiece to subject the workpiece to a shot treatment, the shot treatment apparatus comprising:
the nozzle;
a nozzle moving mechanism to which the nozzle is fixed and which is capable of modifying a position and a pose of the nozzle with respect to the workpiece; and
a three-dimensional information obtaining sensor that three-dimensionally captures an image of the workpiece provided within a treatment compartment to obtain position and pose information of the workpiece;
the shot treatment apparatus further comprising:
a pattern storage portion in which is stored a reference operation pattern of the nozzle when the workpiece is installed at a reference position and a reference pose within the treatment compartment;
a model data storage portion in which is stored three-dimensional model data of the workpiece;
a position/pose displacement calculating portion that compares the position and pose information obtained by means of the three-dimensional information obtaining sensor and reference position and pose data when the three-dimensional model data is provided at the reference position in the reference pose to calculate a displacement in a position and pose of the workpiece from the reference position and pose data; and
a nozzle movement control portion that corrects the reference operation pattern of the nozzle based on the displacement in the position and pose and controls the nozzle moving mechanism to move the nozzle based on the corrected reference operation pattern.

2. The shot treatment apparatus according to claim 1, wherein a hole is opened in the workpiece and the reference operation pattern is constructed so as to subject an interior of the hole to a shot treatment.

3. The shot treatment apparatus according to claim 2, wherein a spatial coordinate value of a shot treatment position and a pose angle of the nozzle in the shot treatment position set corresponding to the hole when subjecting the hole to a shot treatment are registered in the reference operation pattern, and
the nozzle movement control portion corrects the spatial coordinate value of the shot treatment position and the pose angle based on a displacement in the position and pose and moves the nozzle to a position and pose of the corrected spatial coordinate value and the pose angle.

4. The shot treatment apparatus according to claim 3, wherein the nozzle is formed to be long, and the spatial coordinate value and the pose angle are corrected such that a central axis line of the nozzle aligns with a central axis line of the hole.

5. The shot treatment apparatus according to claim 2, wherein the nozzle comprises a nozzle body which has a cylindrical shape and which has a closed distal end, and a through-hole that communicates an interior having the cylindrical shape with the outside is opened in a side surface of the distal end.

6. The shot treatment apparatus according to claim 2, wherein the workpiece is a cylinder block for an internal combustion engine and the hole is a duct that circulates a coolant.

7. The shot treatment apparatus according to claim 1, wherein the three-dimensional information obtaining sensor comprises a sensor body, a case which stores the sensor body and isolates the sensor body from the outside and which comprises an opening, and a shutter provided so as to be able to open and close the opening, and
the sensor body captures an image of the workpiece through the opening, and
the shutter is set to be in an open state when capturing an image of the workpiece by means of the sensor body.

8. The shot treatment apparatus according to claim 1, wherein the position/pose displacement calculating portion detects a defect in the workpiece by three-dimensionally comparing outline shapes when comparing the position and pose information obtained by means of the three-dimensional information obtaining sensor and the reference position and pose data.

9. The shot treatment apparatus according to claim 1, wherein, configured to be capable of subjecting a plurality of types of the workpiece to a shot treatment, the reference operation pattern and the three-dimensional model data are provided corresponding to each of the plurality of types of the workpiece.

10. The shot treatment apparatus according to claim 9, comprising an input apparatus that receives an input relating to a type of the workpiece that is currently the shot treatment target from among the plurality of types of the workpiece, and
a treatment condition for when a shot treatment is performed for the workpiece is stored corresponding to the workpiece.

11. The shot treatment apparatus according to claim 1, wherein the nozzle moving mechanism is an industrial robot having an arm.

12. The shot treatment apparatus according to claim 11, wherein the reference operation pattern is a program generated by means of teaching.

13. A shot treatment method wherein shot material is ejected from a nozzle towards a workpiece to subject the workpiece to a shot treatment, the method comprising:
storing a reference operation pattern of the nozzle, performed by a nozzle moving mechanism to which the nozzle is fixed and which is capable of modifying a position and a pose of the nozzle with respect to the workpiece, when the workpiece is installed at a reference position and a reference pose within a treatment compartment;
storing three-dimensional model data of the workpiece;
obtaining position and pose information of the workpiece by means of a three-dimensional information obtaining sensor that three-dimensionally captures an image of the workpiece provided within the treatment compartment;

comparing the position and pose information obtained by means of the three-dimensional information obtaining sensor and reference position and pose data when the three-dimensional model data is provided at the reference position in the reference pose and calculating a displacement in a position and pose of the workpiece from the reference position and pose data; and correcting the reference operation pattern of the nozzle based on the displacement in the position and pose and controlling the nozzle moving mechanism to move the nozzle based on the corrected reference operation pattern.

\* \* \* \* \*